US008667120B2

(12) United States Patent
Kurebayashi et al.

(10) Patent No.: US 8,667,120 B2
(45) Date of Patent: Mar. 4, 2014

(54) LOAD CONTROL DEVICE AND METHOD THEREOF FOR CONTROLLING REQUESTS SENT TO A SERVER

(75) Inventors: Ryosuke Kurebayashi, Tokyo (JP); Osamu Ishida, Tokyo (JP); Satoru Ota, Tokyo (JP); Tsunemasa Hayashi, Tokyo (JP); Kazuaki Obana, Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 1050 days.

(21) Appl. No.: 12/298,574

(22) PCT Filed: Apr. 25, 2007

(86) PCT No.: PCT/JP2007/058918
§ 371 (c)(1),
(2), (4) Date: Oct. 27, 2008

(87) PCT Pub. No.: WO2007/125942
PCT Pub. Date: Nov. 8, 2007

(65) Prior Publication Data
US 2009/0077233 A1 Mar. 19, 2009

(30) Foreign Application Priority Data

Apr. 26, 2006 (JP) ................. 2006-122196
Jul. 3, 2006 (JP) ................. 2006-183392
Oct. 11, 2006 (JP) ................. 2006-277864

(51) Int. Cl.
*G06F 15/16* (2006.01)
*G06F 15/173* (2006.01)
*G06F 15/177* (2006.01)
*H04L 12/56* (2011.01)
*H04L 12/24* (2006.01)
*H04L 12/26* (2006.01)

(52) U.S. Cl.
CPC ............ *H04L 47/10* (2013.01); *H04L 41/0896* (2013.01); *H04L 43/0894* (2013.01); *H04L 43/16* (2013.01)
USPC ........................... 709/224; 709/203; 709/226

(58) Field of Classification Search
CPC ...................... H04L 47/10; H04L 41/0896; H04L 43/0894; H04L 43/16
USPC ......................... 709/217–228, 203
See application file for complete search history.

(56) References Cited

U.S. PATENT DOCUMENTS

| 6,141,759 A | 10/2000 | Braddy |
| 6,308,238 B1 | 10/2001 | Smith et al. |
| 6,650,343 B1 | 11/2003 | Fujita et al. |
| 7,340,532 B2 * | 3/2008 | Swildens ...................... 709/238 |
| 7,379,458 B2 * | 5/2008 | Inoue et al. ................... 370/392 |
| 7,454,421 B2 * | 11/2008 | Imaeda et al. ................ 707/100 |
| 7,734,814 B2 * | 6/2010 | Swildens ...................... 709/238 |
| 2003/0108052 A1 * | 6/2003 | Inoue et al. ................... 370/399 |
| 2003/0145236 A1 | 7/2003 | Tateoka |
| 2005/0138626 A1 | 6/2005 | Nagami et al. |
| 2006/0143189 A1 * | 6/2006 | Imaeda et al. ................ 707/100 |
| 2007/0171903 A1 * | 7/2007 | Zeng et al. .................... 370/389 |
| 2007/0186003 A1 * | 8/2007 | Foster et al. .................. 709/231 |
| 2007/0245409 A1 * | 10/2007 | Harris et al. ...................... 726/5 |
| 2009/0094376 A1 * | 4/2009 | Kosiba ........................ 709/231 |

FOREIGN PATENT DOCUMENTS

| JP | H03-278136 | 12/1991 |
| JP | 2001-344228 | 12/2001 |
| JP | 2004-094711 A | 3/2004 |
| JP | 3566699 | 6/2004 |
| JP | 2005-503626 | 2/2005 |
| JP | 3646582 | 2/2005 |
| JP | 2005-184165 A | 7/2005 |
| WO | 02/37799 A2 | 5/2002 |
| WO | 03/026244 A2 | 3/2003 |

OTHER PUBLICATIONS

Matsunuma, "Session-Level Queue Scheduling for Improving Performance Deterioration of Web Application When Overloaded", 2nd Dependable Software Workshop, pp. 105-114, Jan. 2005.
Wang, et al., "Study on Enhanced Strategies for TCP/IP Offload Engines", Parallel and Distributed Systems, 2005 Proceedings, 11th International Conference on Fukuoka, Japan, Jul. 20-22, 2005, Piscataway, NJ, USA, IEEE, vol. 1, Jul. 20, 2005, pp. 398-404.

* cited by examiner

*Primary Examiner* — Haresh N Patel
(74) *Attorney, Agent, or Firm* — Kilpatrick Townsend & Stockton LLP

(57) ABSTRACT

The number of response-waiting requests which are already sent to a server (4) but to which a response is not yet returned from the server (4) is limited. To limit this number, received requests are temporarily accumulated in a buffer if the number of response-waiting requests has reached a threshold and, until the number of response-waiting requests falls below the threshold, requests are not sent from the buffer. The execution status of the server (4) is monitored, and the threshold is increased when the response time from the server (4) to a request is within an allowable range, and the threshold is decreased when the response time exceeds the allowable range. In addition, TCP connections between a load control device (3) and clients (1-1, ..., 1-*n*) are aggregated so that the number of simultaneous connections of TCP connections between the server (4) and the load control device (3) becomes equal to or smaller than the threshold of the number of response-waiting requests.

20 Claims, 20 Drawing Sheets

FIG. 4
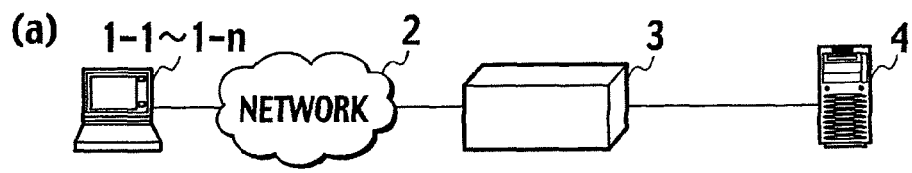
(a)
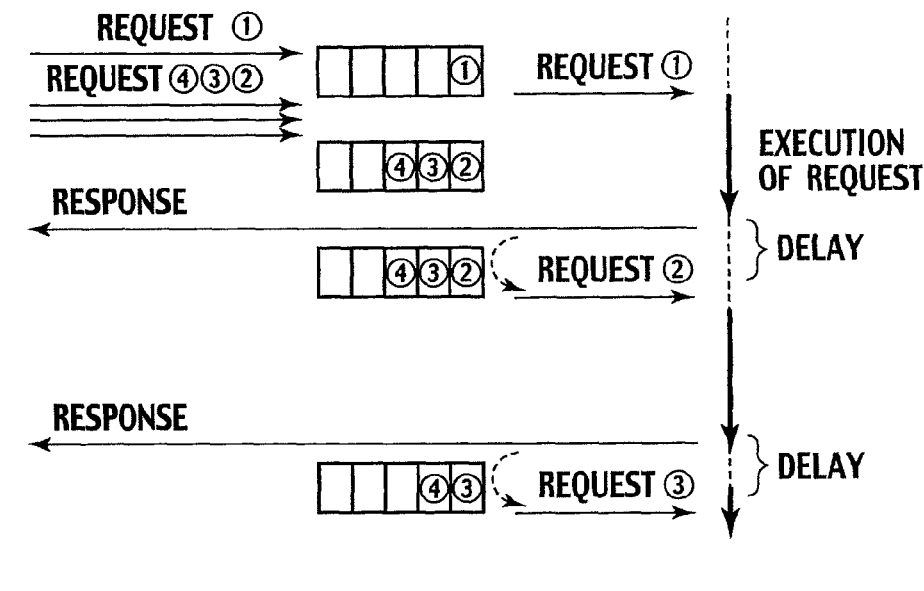
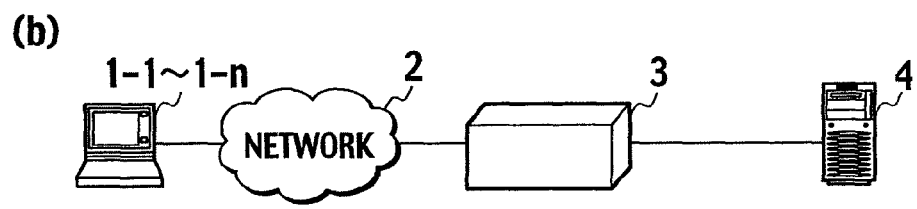
(b)
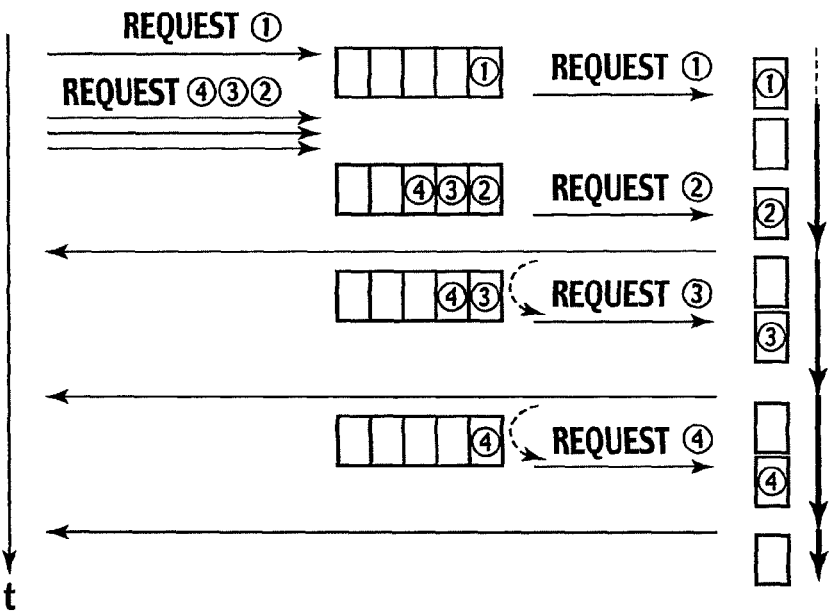

FIG. 9

| METHOD NAME | CLASS |
|---|---|
| OPTIONS | LOW PRIORITY |
| DESCRIBE | LOW PRIORITY |
| SETUP | LOW PRIORITY |
| PLAY | HIGH PRIORITY |
| RECORD | HIGH PRIORITY |
| PAUSE | HIGH PRIORITY |
| ANNOUNCE | HIGH PRIORITY |
| REDIRECT | HIGH PRIORITY |
| GET_PARAMETER | HIGH PRIORITY |
| SET_PARAMETER | HIGH PRIORITY |
| TEARDOWN | HIGH PRIORITY |

FIG. 12

| REQUEST ID | CLIENT SIDE SOCKET ID |
|---|---|
| 0 | 3 |
| 1 | 2 |
| 2 | 1 |
| 4 | 4 |

FIG. 14

| SOCKET ID | STATUS | REQUEST ID |
|---|---|---|
| 0 | BUSY | 3 |
| 1 | FREE | - |
| 3 | FREE | - |

|  | SERVER | LOAD CONTROL DEVICE |
|---|---|---|
| CPU | Pentium4 2.2GHz | Pentium4 2.53GHz |
| MAIN STORAGE | 1.5GB | 1GB |
| OS | Linux 2.4 | FreeBSD |
| HTT SERVER | APACHE2 (THE NUMBER OF SIMULTANEOUSLY CONNECTABLE TCP CONNECTIONS IS SET TO 150) | |
| WEB APPLICATION | FILE SEARCH CGI | |

| | SERVER | LOAD CONTROL DEVICE |
|---|---|---|
| CPU | Pentium4 2.53GHz | Pentium4 2.53GHz |
| MAIN STORAGE | 2GB | 2GB |
| OS | FreeBSD | FreeBSD |
| HTT SERVER | APACHE2 (THE NUMBER OF SIMULTANEOUSLY CONNECTABLE TCP CONNECTIONS IS SET TO 150) | |
| WEB APPLICATION | ONLINE SHOPPING SITE IS SIMULATED | |

LOAD CONTROL DEVICE AND METHOD THEREOF FOR CONTROLLING REQUESTS SENT TO A SERVER

CROSS REFERENCE TO RELATED APPLICATIONS

This application is the U.S. National Phase of PCT/JP2007/058918 filed on 25 Apr. 2007 which claims the benefit Japanese Application No. JP2006-122196 filed on 26 Apr. 2006, JP2006-183392 filed on 3 Jul. 2006, and JP2006-277864 filed on 11 Oct. 2006, the contents of which are incorporated by reference herein.

TECHNICAL FIELD

The present invention is used for a device provided between a client and a server to transfer a request, received from the client, to the server and to transfer a response, returned from the server in response to the request, to the client. More particularly, the present invention relates to the scheduling of a request. Although focus is on a Web server in this specification, this specification does not necessarily limit the application of the present invention to other servers.

BACKGROUND ART

Widespread use of the Internet allows the user to use various services via a network. Examples include mail, homepage browsing, search, online commerce, IP phones, and video on demand. Those network services may be provided in various forms and, recently, the use of a Web server has become a mainstream of the interface with clients.

The basic mechanism of services (Web services) using a Web server is as follows. First, a client sends a request, which specifies a URL (Uniform Resource Locator) identifying a content to be acquired, to a Web server. In response to this request, the Web server sends contents, corresponding to the URL included in the request, to the client as the response. Web services are provided by the repetition of this exchange between requests and responses.

HTTP (Hyper Text Transfer Protocol) is used as a communication protocol to transfer requests and responses. In this specification, the whole server system that performs Web services is called a Web server, the function to process the HTTP protocol on a Web server is called an HTTP server, and the function to generate contents according to a request is called a Web application.

In addition, video and audio streaming is increasingly used as contents provided by the Web services. The basic mechanism of streaming is as follows.

First, the Web browser of a client acquires the metafile of stream contents from a Web server. The metafile describes the URL of the stream contents. At the same time, the Web browser starts the player (stream reproduction application) associated with the extension of the metafile. Based on the URL indicated by the metafile acquired from the Web server, the player requests the streaming server to send the stream contents. Finally, the streaming server sends streaming data to the player.

In streaming, the server generally uses the RTSP (Real Time Streaming Protocol) to control the reproduction of streaming contents. The RTSP protocol, a protocol based on the HTTP protocol, sends and receives a request and a response, returned in response to the request, between the client and the server to control the reproduction of the stream contents.

The major control methods, which can be used by an RTSP request, are initialization (SETUP), reproduction (PLAY), and stop (TEARDOWN). RTSP, which controls multiple streams at the same time, has the concept of a session. That is, RTSP processes the period of time, from the moment the player sends a SETUP request to the moment the player sends a TEARDOWN request to terminate streaming, as one session.

When a SETUP request is received from the player, the stream server issues a unique session ID. The session ID is attached to the response and is notified to the client. The player attaches the notified session ID to subsequent requests to allow the stream server to identify a session to be controlled.

As the Web services become increasingly popular, the problems to be solved for using the services smoothly are becoming apparent. One of those problems is how to process extremely high traffic caused by the concentrated use of services.

Examples of the concentrated use of services include the concentration of requests for actively-traded stocks or for the sales of tickets and phone calls during natural disaster. A high volume of meaningless requests such as F5 attacks are sometimes sent by a malicious client. Too many requests, if sent due to those factors, degrade the request processing performance of the server.

The following are the factors that degrade the server's request processing performance during extremely high traffic times. First, the input/output overhead, such as interrupts and TCP/IP processing, is increased when the server receives too many requests to process. Second, the number of threads or processes for processing requests is increased and, as a result, the context switching overhead, which is an overhead required for switching threads and processes, becomes obvious. Third, because the response time until a response is returned to a client is increased, clients that cannot wait long are forced to cancel their requests.

As a result of those factors, the problem that is generated is that the processing performance of the server is degraded as the server becomes more and more congested.

FIG. 1 shows the experimental result showing a decrease in the processing performance of a Web server when the Web server receives too many requests. The horizontal axis indicates the input request rate, and the vertical axis indicates the throughput. FIG. 1 shows a case in which requests are sent to a Web server at a varying input request rate, that is, by varying the number of requests per unit time (rps). The throughput, that is, the number of requests (rps) the Web server can complete per unit time, is measured. FIG. 1 shows that the throughput is proportional to the input rate if the input request rate is within a fixed range (straight line (a) in FIG. 1). However, when the maximum throughput of the Web server is reached, the throughput begins to fall (straight line (c) in FIG. 1). So, there is a need for a technology that keeps the maximum performance of the Web server along the broken line (b) in FIG. 1 even after the Web server receives the number of requests that exceeds the maximum performance of the Web server. For reference, FIG. 2 shows the behavior of ideal throughput.

To prevent the server performance from being degraded by extremely high traffic, methods are proposed that limit in advance the amount of requests sent to a server. The following indexes are used to limit the amount of requests: (a) number of TCP connections, (b) server load status, (c) bandwidth, and (d) degree of parallelism.

When (a) the number of TCP connections is used as the index, the upper limit of the number of TCP connections connectable simultaneously is determined to avoid the overload of the server. This method is used for general-purpose HTTP servers such as Apache and load balancers. However, the load varies largely among TCP connections depending upon the request type, client line speed, and so on. Because of this, a problem is generated that a new TCP connection cannot be established because the server becomes overloaded before the number of TCP connections reaches the upper limit or, conversely, because the number of TCP connections reaches the upper limit even if the server resources are available.

When (b) the server load status is used as the index, the server load status is estimated from the CPU usage rate, memory usage amount, or response time to determine if the server is overloaded. If it is determined that the server is overloaded, the traffic control is performed to reduce the server load, for example, by transferring or rejecting a new request. However, because the traffic control is performed after it is determined that the server is overloaded, a temporary decrease in the server performance cannot be avoided.

When (c) bandwidth is used as the index, the bandwidth control function such as a shaper is used to limit the amount of traffic that reaches the server.

However, the bandwidth cannot be used as the index for accurately measuring the load on the server. For example, the download of an image file occupies large bandwidth but gives a relatively lighter load on the server. So, it is difficult to absolutely avoid the overload by limiting the bandwidth while fully utilizing the resources of the server.

When (d) degree of parallelism is used as the index, the number of threads or processes that the server executes at the same time is limited. Limiting the number of threads or processes in this way can reduce the context switching overhead involved in the increase in the number of threads or processes for processing requests.

An example of controlling the degree of parallelism is described in Document 1 (Masahiro Matsunuma, Hideaki Hibino, Yoshiki Sato, Kenichi Mitsuki, Sigeru Chiba: "Session-Level Queue Scheduling for Improving Performance Degradation of Web Application at Overload Time", Second Dependable Software Workshop (DSW'05), pp. 105-114, January, 2005) in which the HTTP server is extended to limit the degree of parallelism on a page basis. However, even if the degree of parallelism is controlled on the server, the overhead of interrupts or TCP/IP processing, which is the primary cause of request-processing performance degradation and which is involved in the reception of too many requests for the server to process, cannot be avoided. The result is that the processing performance of the server is degraded as with other methods during extremely high traffic times. Another problem is that, because the HTTP server or the Web application must be changed, it is difficult to introduce this method into the services already in operation.

Another example of controlling the degree of parallelism is to limit the number of sessions on a streaming server. That is, a streaming server usually has an upper limit on the number of sessions that can be active thereon at the same time. Putting this limit avoids the overload on the server generated by an increase in the number of sessions.

However, limiting the number of sessions does not limit the reception of control requests via RTSP. Because of this, the problem is that the concentration of RTSP requests on a stream server increases the overhead for processing requests and degrades the processing performance of the stream server.

The performance of a server is degraded by an increase in the interrupts, input/output, and context switching overhead that are caused when new requests are received as shown in FIG. 3(a). To remove such an overhead and to maximize the performance of the server, it is ideal that the next request arrives immediately after the server processing is completed as shown in FIG. 3(b). In this case, an overhead that is generated when the server receives too many requests to process is not generated. In addition, there is no spare time in the server from the moment the processing is completed to the moment the next request arrives.

DISCLOSURE OF INVENTION

In view of the background described above, it is an object of the present invention to provide a load control device and a method thereof that can avoid the performance degradation of a server when too many requests are received.

The load control device according to the present invention is provided between a client and a server to relay requests and responses between them. That is, the load control device sends a request, received from the client, to the server and sends a response, returned from the server, to the client. At this time, the present invention limits the number of requests which are already sent to the server but to which a response is not yet returned from the server, that is, response-waiting requests. To limit the number of requests in this way, the load control device stores the received requests in a buffer if the number of response-waiting requests has reached the threshold and does not send requests until the number of response-waiting requests falls below the threshold.

The present invention limits the requests sent to the server so that the ideal arrival of requests shown in FIG. 3(b) can be realized. FIG. 4(a) shows a case in which the threshold of the number of response-waiting requests is set to "1" for brevity. To realize the arrival of requests in FIG. 3(b), it is necessary to identify when the execution of a thread is completed in the server. In the present invention, the completion of the execution of a thread in the server is identified by receiving a response from the server. And, the next request is sent to the server after a response to the request sent previously is returned. According to the present invention, the amount or requests that cannot be processed by the server is not sent to the server.

So, the overhead of the server involved in receiving requests is reduced.

In FIG. 4(a), the server is idle from the time the server returns a response to the time the load control device sends the next request. To avoid this problem, a value larger than "1" can be set as the threshold of the number of response-waiting requests in the present invention. FIG. 4(b) shows an example of execution when the threshold of the number of response-waiting requests is set to "2". Setting the number of response-waiting requests to a value that is two or larger increases the number of threads that are in the executable state in the server. After the execution of a thread is completed, the execution of the next thread can be started immediately and, therefore, the resources usually do not become idle. In addition, the present invention allows the load of the server to be controlled externally without referencing the internal information on the server. This means that the present invention can be introduced without adding additional functions to, or modifying the function of, the server currently in operation.

In addition, the threshold of the number of response-waiting requests can be adjusted automatically according to the present invention. The threshold of the optimum number of response-waiting requests depends on the server system configuration (number of servers, number of CPUs, etc.) and the application execution time. Consequently, statically setting the threshold of the number of response-waiting requests requires performance evaluation in advance, thus increasing the load of the manager of the load control device.

For example, the number of requests that can be simultaneously processed by a server with two CPUs is larger than the number of requests that can be simultaneously processed by a server with one CPU. Therefore, to maximize the throughput of the server, the threshold of the number of response-waiting requests when there are two CPUs must be set larger than when there is one CPU.

For an application, the shorter the execution time is, the larger becomes the relative sending delay between the load control device and the server. Therefore, to hide the fact that the server becomes idle because of the sending delay time, a larger threshold of the number of response-waiting requests must be set for an application whose execution time is shorter.

When the threshold of the number of response-waiting requests is increased, the number of requests than can be multi-processed in the server is increased. Therefore, the threshold, if too large, increases the context switching overhead, and decreases the throughput, of the server. Another problem is that the response time, from the time the load control device sends a request to the server to the time a response is returned, becomes worse.

Therefore, the present invention measures the server response time or throughput and, according to the measurement result, automatically adjusts the threshold of the number of response-waiting requests. This method gives a desirable response time and throughput regardless of the server system configuration and applications. As a result, the load of the manager involved in setting the threshold of response-waiting requests can be reduced.

As shown in conventional technology a), a Web server generally imposes the upper limit of the number of simultaneous connections of TCP connections. However, the limit on the number of simultaneous connections of TCP connections, if imposed, sometimes prevents the load control based on the number of response-waiting requests from functioning properly. To solve this problem, the present invention combines the load control based on the number of response-waiting requests with connection aggregation that is one of conventional technologies. Connection aggregation is a technology that allows multiple clients to share a TCP connection, established between the load control device and the server, using the Keep-Alive function in HTTP1.1.

When connection aggregation is not used, more TCP connections than currently connected clients are connected between the load control device and the server.

Therefore, when many clients each of which sends requests less frequently attempt to connect to the server, there is a possibility that the number of connections of TCP connections of the server reaches the upper limit before the number of response-waiting requests reaches the threshold. As a result, the amount of requests large enough for fully utilizing the computation resources of the server cannot be supplied to the server. In contrast, when connection aggregation is used, the load control device side can make adjustment so that the number of TCP connections does not exceed the threshold of the number of response-waiting requests. That is, as long as the upper limit on the number of simultaneous connections of TCP connections is larger than the threshold of the number of response-waiting requests, the limit on the number of simultaneous connections of TCP connections is disabled.

That is, the present invention provides a load control device, provided between a client and a server, for sending a request, received from the client, to the server and for sending a response, returned from the server in response to the request, to the client.

The present invention is characterized in that a load control device comprises means that limits a number of response-waiting requests which are already sent to the server but to which responses are not yet returned from the server, wherein the means that limits the number comprises a buffer in which received requests are temporarily accumulated if the number of response-waiting requests has reached a threshold; and means that does not send a request from the buffer until the number of response-waiting requests falls below the threshold. For example, the threshold is a value larger than 1.

It is preferable that the load control device further comprises monitoring means that monitors an execution status of the server; and means that increases the threshold of the number of response-waiting requests when a response time of the server to a request is within an allowable range, and decreases the threshold of the number of response-waiting requests when the response time exceeds the allowable range, based on a monitor result of the monitoring means.

Alternatively, it is preferable that the load control device further comprises monitoring means that monitors an execution status of the server; means that measures throughput for each threshold of the number of response-waiting requests based on a monitor result of the monitoring means, the throughput being a number of requests processed by the server per unit time; and means that increases the threshold if throughput for a current threshold is higher than throughput for a threshold lower than the current threshold and decreases the threshold if throughput for the current threshold is lower than throughput for a threshold lower than the current threshold.

At this time, it is possible that the load control device further comprises means that determines if the number of response-waiting requests has reached the threshold; and means that determines whether or not the threshold is to be increased or decreased if the threshold is reached. This configuration solves the problem that the threshold of the number of response-waiting requests is increased without limitation when the server is not loaded enough.

It is preferable that the load control device further comprises means that aggregates TCP connections between itself and the clients so that a number of simultaneous connections of TCP connections between the server and itself becomes equal to or smaller than the threshold of the number of response-waiting requests.

It is possible that the buffer comprises means that performs priority control of requests based on identification information on the sending clients.

Alternatively, it is possible that the buffer comprises means that performs priority control of requests based on whether or not a particular pattern is included in a particular position or range in a request.

Alternatively, it is possible that the buffer comprises means that performs priority control of requests based on whether or not a particular variable in a request is larger than a pre-set threshold.

Alternatively, it is possible that the buffer comprises means that performs priority control of requests based on whether or not a request is encrypted.

Alternatively, it is possible that the buffer comprises means that notifies a busy message to a request accumulated for a predetermined time or longer.

Alternatively, it is possible that the server is a Web server and the buffer comprises means that performs priority control of requests based on display priority of a page display of requests.

Alternatively, it is possible that the request is sent from the clients to the load control device via a TCP connection and the buffer comprises means that performs priority control of requests based on whether or not another TCP connection is established between the clients and the load control device, a number of TCP connections, or whether or not the request is a first request of a TCP connection.

Alternatively, it is possible that the load control device further comprises means that, when the response contains a URL of a page component to be automatically acquired by a browser, temporarily stores a set of identification information on a response-sending destination and the URL wherein the buffer comprises means that performs priority control of requests based on whether or not a set of identification information on a request sending-source and a URL matches the set of identification information on a response-sending destination and the URL that is temporarily stored.

Alternatively, it is possible that the load control device further comprises means that performs priority control of requests based on a progress status of a session to which the request belongs.

Alternatively, it is possible that the load control device further comprises means that caches session identification information on a session, to which a request processed by the server belongs, for a fixed period of time; and means that performs priority control of requests based on whether or not the request has the identification information on a session that is cached.

Alternatively, it is possible that the buffer comprises means that performs priority control of requests based on degree of suspicion of unauthorized access of traffic sent from the clients.

The present invention may be considered also as a program. That is, the present invention is a program that is installed in a general-purpose information processing device and that causes the general-purpose information processing device to implement a function equivalent to a function of the load control device of the present invention.

The present invention may be considered also as a recording medium. That is, the present invention is a recording medium on which the program of the present invention is recorded. The program of the present invention is recorded on a recording medium, and the general-purpose information processing device uses this recording medium to install the program of the present invention. Alternatively, the program of the present invention may be installed directly into the general-purpose information processing device from the server, which holds the program of the present invention, via a network.

Thus, the general-purpose information processing device may be used to implement the load control device of the present invention.

The present invention may be considered as a load control method executed by the load control device of the present invention. That is, the present invention is a load control method comprising a limiting step of limiting a number of response-waiting requests which are already sent to the server but to which responses are not yet returned from the server, wherein the limiting step comprises a step of temporarily accumulating received requests in a buffer if the number of response-waiting requests has reached a threshold; and a step of not sending a request from the buffer until the number of response-waiting requests falls below the threshold. For example, the threshold is a value larger than "1".

It is preferable that the load control method further comprises a monitoring step of monitoring an execution status of the server; and a step of increasing the threshold of the number of response-waiting requests when a response time of the server to a request is within an allowable range, and decreasing the threshold of the number of response-waiting requests when the response time exceeds the allowable range, based on a monitor result of the monitoring step.

Alternatively, it is preferable that the load control method further comprises a monitoring step of monitoring an execution status of the server; a step of measuring throughput for each threshold of the number of response-waiting requests based on a monitor result of the monitoring step, the throughput being a number of requests processed by the server per unit time; and a step of increasing the threshold if throughput for a current threshold is higher than throughput for a threshold lower than the current threshold and decreasing the threshold if throughput for the current threshold is lower than throughput for a threshold lower than the current threshold.

It is preferable that the load control method further comprises a step of determining if the number of response-waiting requests has reached the threshold; and a step of determining whether or not the threshold is to be increased or decreased if the threshold is reached.

It is preferable that the load control method further comprises a step of aggregating TCP connections between itself and the clients so that a number of simultaneous connections of TCP connections between the server and itself becomes equal to or smaller than the threshold of the number of response-waiting requests.

The present invention can avoid the performance degradation of a server when too many requests are received. At the same time, the present invention automatically sets a threshold for appropriate control, thus reducing the load of a device manager.

BRIEF DESCRIPTION OF THE DRAWINGS

FIG. 4 is a diagram showing the status of request arrival at a server of the present invention.

FIG. 9 is a diagram showing an example of class classification based on RTSP request method names.

FIG. 12 is a diagram showing a request table.

FIG. 14 is a diagram showing a server side socket table.

BEST MODE FOR CARRYING OUT THE INVENTION

First Embodiment

A first embodiment of the present invention will be described with reference to the drawings.

Figure 1:
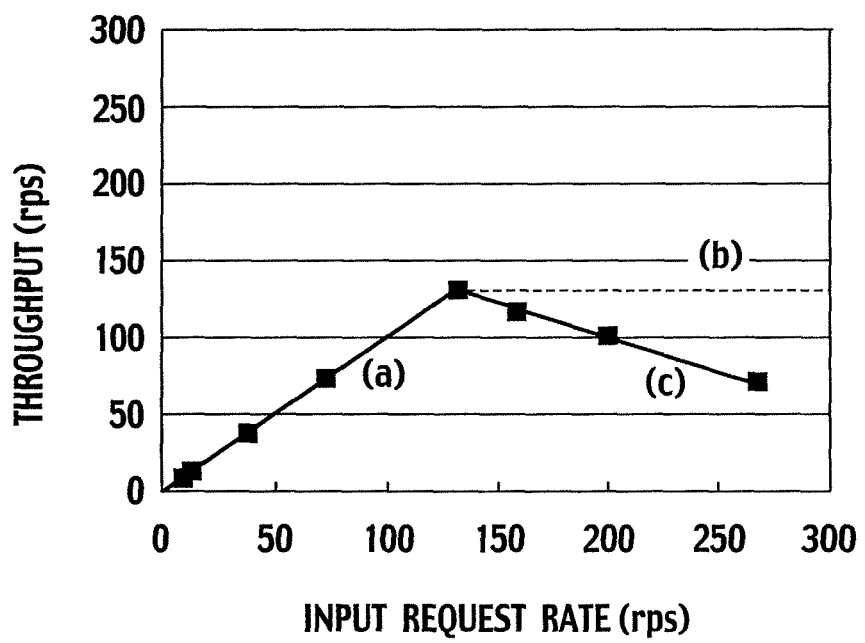
FIG. 1 is a diagram showing the degradation of the processing performance of a server when too many requests are received.
Figure 2:
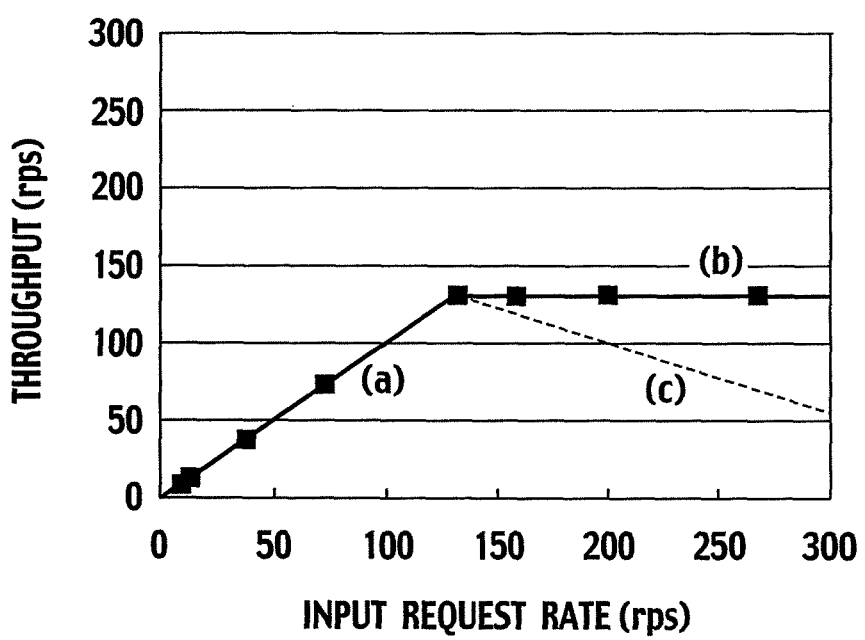
FIG. 2 is a diagram showing the behavior of ideal throughput.
Figure 3:
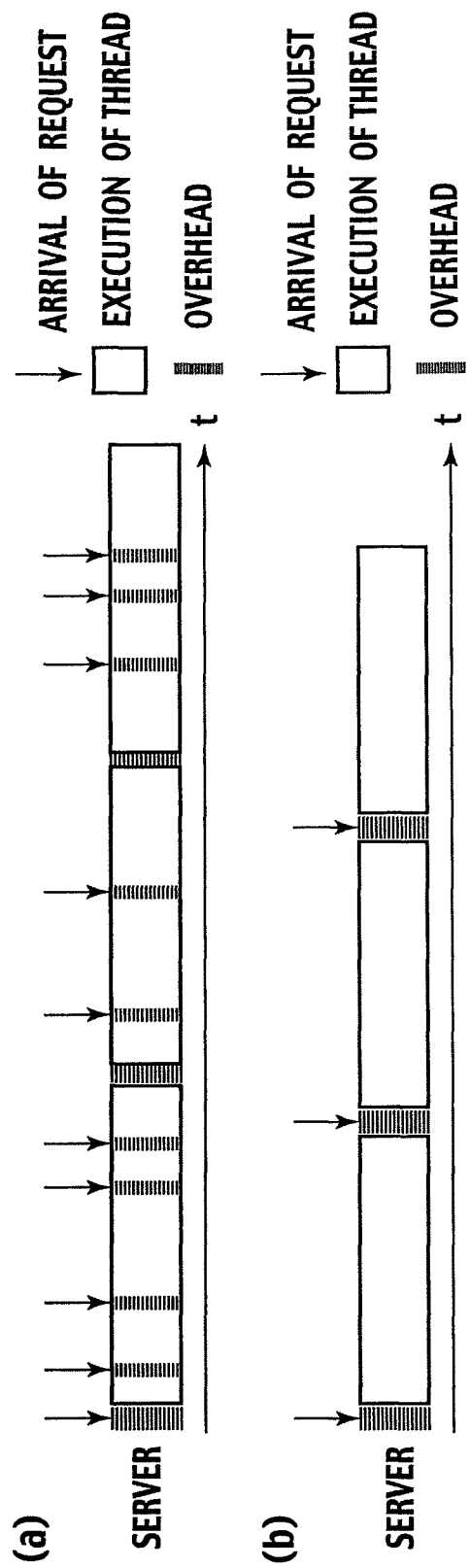
FIG. 3 is a diagram showing the behavior of a server when too many requests are received and the ideal status of request arrival at a server.
Figure 5:
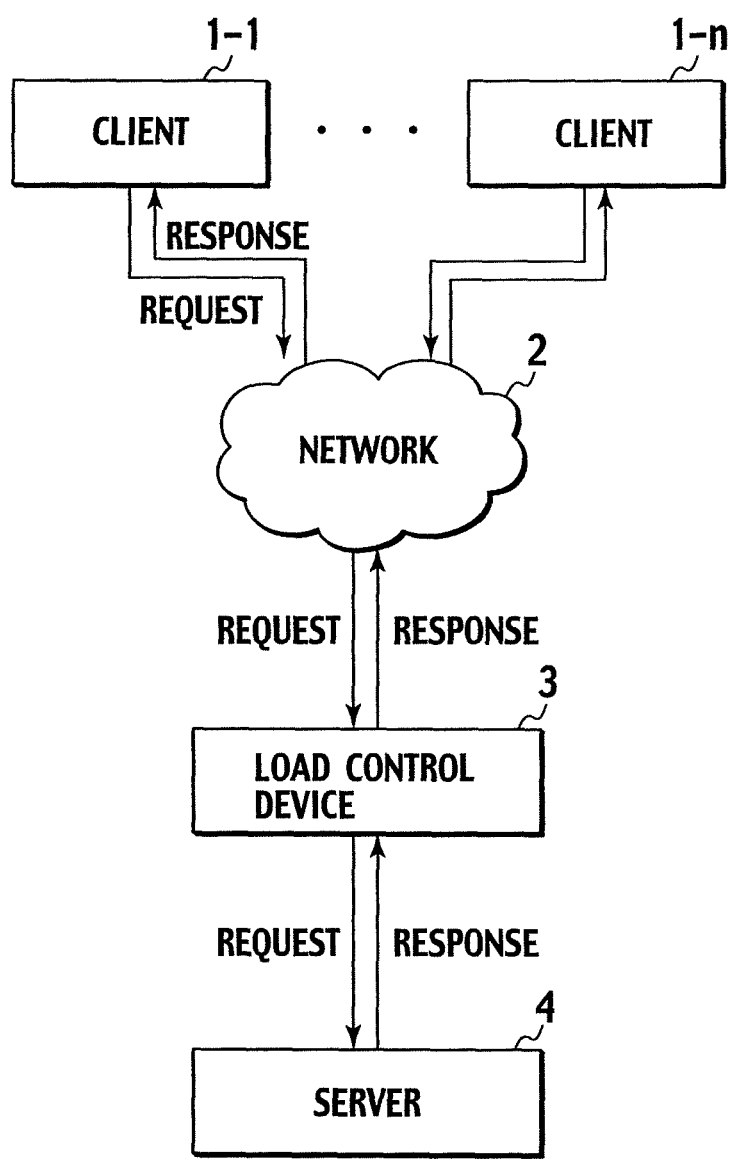
FIG. 5 is a diagram showing the general configuration in a first embodiment.

FIG. 5 is a block diagram showing the first embodiment of the present invention. The present invention comprises clients 1-1 to 1-$n$ that issue requests, a server 4 that returns a response corresponding to a request, and a load control device 3 that relays requests and responses. The server 4 may be a software module such as Apache or may be a hardware module whose physical resources such as a CPU and a memory are independent of the load control device 3. This load control device 3 may be connected to two or more servers 4 to allow one load control device 3 to control the load of multiple servers 4. In addition, the load control device 3 may be created by extending the existing technologies, such as a reverse proxy, a Web accelerator, a Firewall, and a load balancer. The load control device 3 monitors the number of requests which are already sent to the server 4 but to which responses are not yet returned, that is, the number of response-waiting requests. When the number of response-waiting requests exceeds a predetermined threshold, a received request is buffered. And, the load control device 3 does not send the request until the number of response-waiting requests falls below the threshold.

Figure 6:
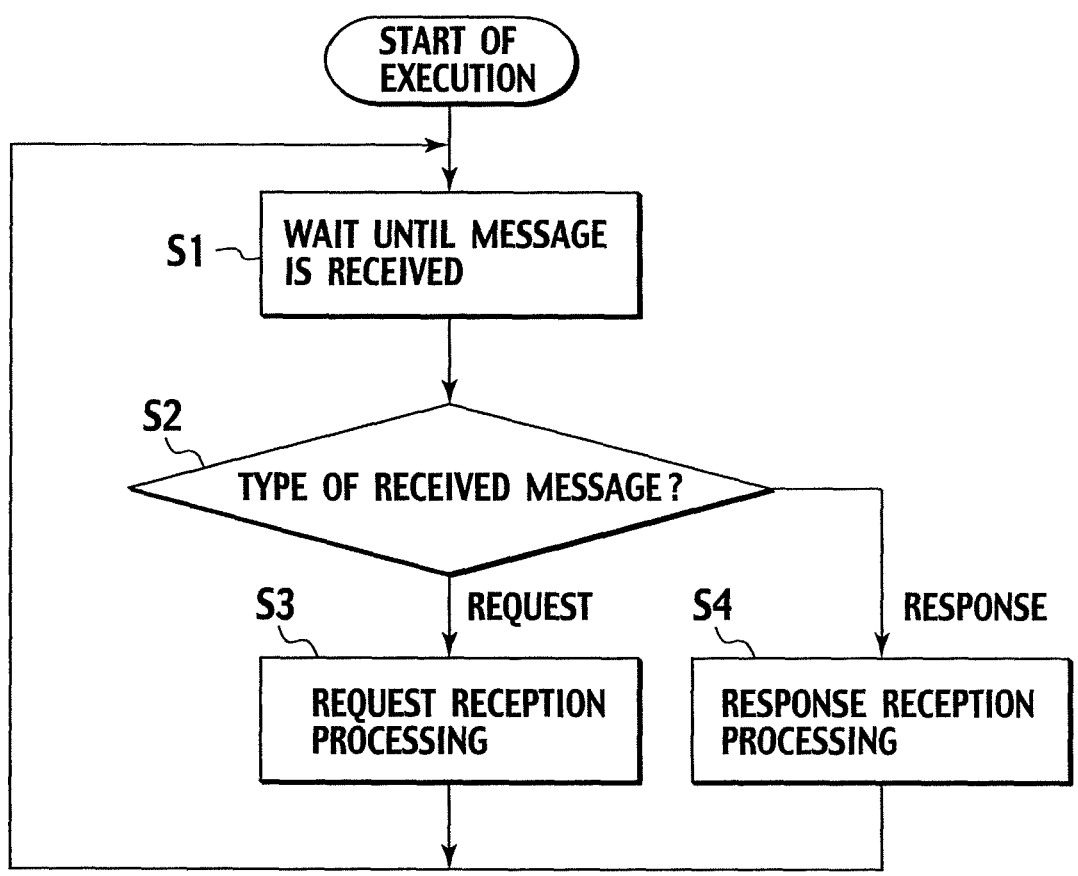
FIG. 6 is a flowchart showing the processing procedure of a load control device in the first embodiment.

FIG. 6 shows the processing procedure of the load control device 3. When the execution is started, the load control device 3 first waits until a message is received (S1). The load control device receives only two types of message: request and response. When a message is received (S2), the load control device 3 starts request reception processing if the message is a request (S3) and starts response reception processing if the message is a response (S4).

Figure 7:
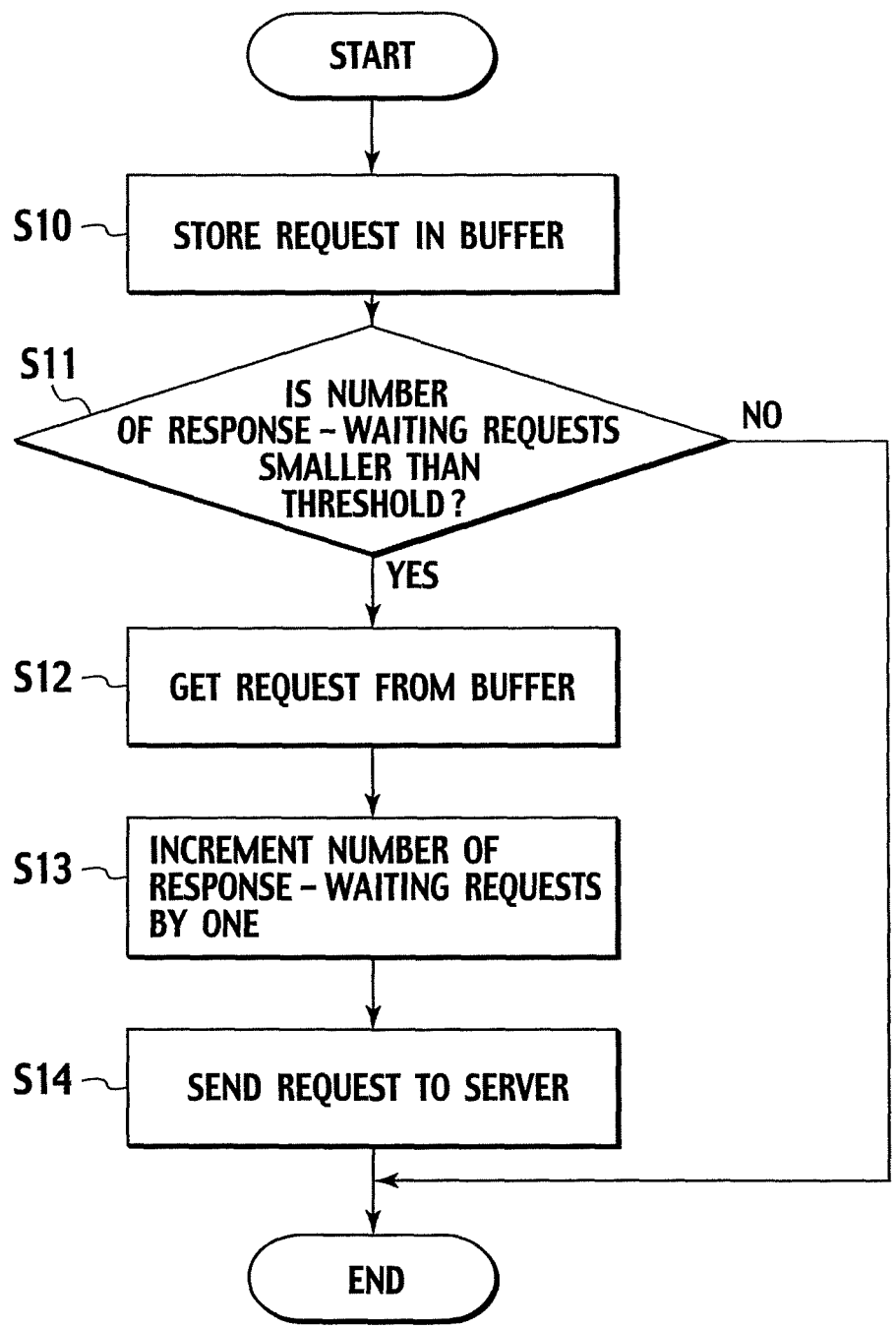
FIG. 7 is a flowchart showing the execution procedure of request reception processing in the first embodiment.

FIG. 7 shows the execution procedure of request reception processing. If a request is received, the load control device 3 stores the request in the buffer (S10). Next, the load control device 3 checks if the number of response-waiting requests is smaller than the threshold (S11). In this embodiment, it is assumed that an arbitrary value is given statically to the threshold of the number of response-waiting requests. If the number of response-waiting requests is equal to or larger than the threshold (S11), the load control device 3 does not send a request to the server 4 but terminates this processing. If the number of response-waiting requests is smaller than the threshold (S11), the load control device 3 gets one request from the buffer (S12). Next, the load control device 3 increments the number of response-waiting requests by one (S13) and sends the request to the server 4 (S14).

Figure 8:
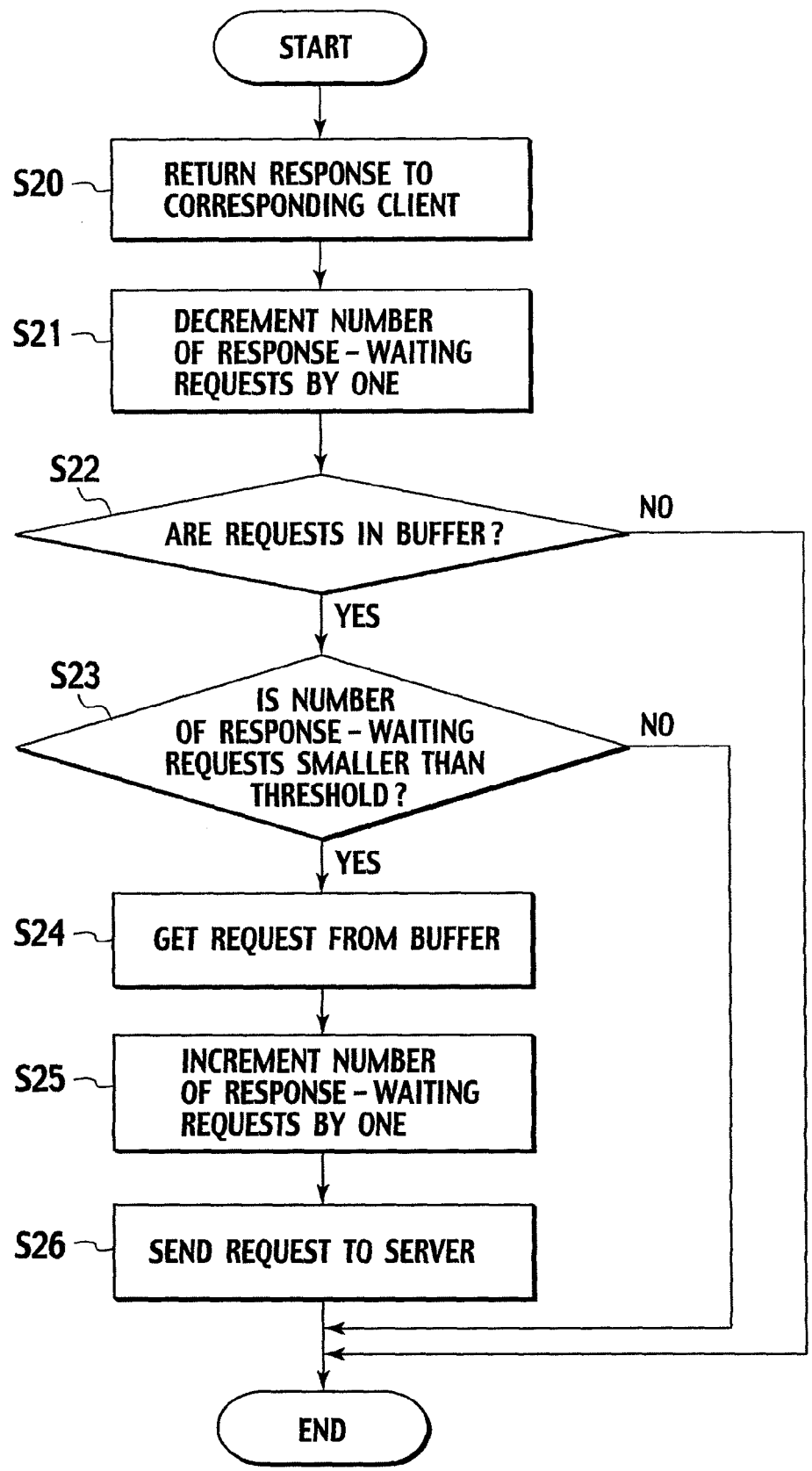
FIG. 8 is a flowchart showing the execution procedure of response reception processing in the first embodiment.

Next, FIG. 8 shows the execution procedure of response reception processing. First, the load control device 3 returns a received response to the client from which the request corresponding to the response was sent (S20). Next, the load control device 3 decrements the number of response-waiting requests by one (S21). After that, the load control device 3 checks if there are transmission-waiting requests in the buffer (S22). If there is no such request (S22), the load control device 3 terminates the processing. If there are requests (S22), the load control device 3 tries to send a request in the same way as in the request reception processing. That is, the load control device 3 checks if the number of response-waiting requests is smaller than the threshold (S23). If the number of response-waiting requests is equal to or larger than the threshold (S23), the load control device 3 does not send a request to the server 4 but terminates this processing. If the number of response-waiting requests is smaller than the threshold (S23), the load control device 3 selects and gets one request from the buffer (S24). Next, the load control device 3 increments the number of response-waiting requests by one (S25) and sends the request to the server 4 (S26).

As described above, if the number of response-waiting requests exceeds the threshold, the load control device 3 does not send a request to prevent too many requests from being sent to the server 4. By storing the requests in the buffer when the threshold is exceeded, an instantaneous increase/decrease in the amount of requests is absorbed. As a result, requests can be stably supplied to the server 4.

An algorithm for scheduling the execution sequence of requests in the buffer is that the requests are processed using one queue on a FIFO (First-In First-Out) basis. It is also possible to perform priority control using multiple queues according to the importance of requests or the quality of requests. In this case, the requests are classified according to a predetermined rule and, based on the result, priority control parameters (for example, priority, weight, timeout time) are set. Here, a set of requests, generated as a result of classifying requests based on a predetermined rule, is defined as a class. The requests are stored in queues on a class basis, and the request retrieval sequence among those queues is scheduled based on the priority control parameters. For this scheduling algorithm, the existing priority scheduling algorithms may used, for example, Priority Queuing in which requests are processed beginning with those belonging to the highest priority class, Waited Fair Queuing in which rate control is performed based on the weight of each class, and Waited Round Robin. Instead of queues, EDF (Earliest Deadline First) may be used in which requests are arranged in ascending order of the length of time to the timeout. The priority control of requests allows the server 4 to process requests with priority given to important requests or time critical requests.

In some cases, when a request is stored in the buffer, the number of requests in the buffer has already reached the maximum number of requests that can be stored. In this case, a request is selected from the buffer and one of the following is executed.

Discard: A request is discarded.

Reject: The sending of a request to the server 4 is canceled. The load control device 3 sends a busy message and so on to clients 1-1 to 1-$n$. Unlike the discarding of a request, this method can clearly notify the clients 1-1 to 1-$n$ that the request has failed because of the concentration of requests.

Forward: A request is transferred to a standby server provided for use at overload time. This method allows the standby server to process the request on behalf of the server 4 on which load is concentrated.

It is also possible to set a timeout on each request in the buffer. When a request which has timed out is detected, the same processing may be performed as when the maximum number of requests that can be stored in the buffer is reached.

To perform priority control for requests, the requests are classified into classes according to a predetermined rule and are scheduled based on parameters such as priority, a weight, and a timeout time that are set for each class. For providing Web services efficiently, the requests are classified into classes, to which they belong, according to the rules given below. It is possible to use only one of those examples or to combine multiple examples to classify requests into classes.

Classification of requests into classes based on client identification information Classification of requests into classes based on content of requests Classification of requests into classes based on whether requests are encrypted Classification of requests into classes based on progress status of page processing Classification of requests into classes based on progress status of session processing Classification of requests into classes based on degree of suspicion of invalidity (Classification of Requests into Classes Based on Client Identification Information)

Requests are classified into classes according to the sending clients of requests. The following shows examples.

Classification of requests into classes based on source IP addresses: When TCP/IP is used as the protocol for sending a request, the client can be identified from the source IP address. So, by selecting a queue based on the source IP address, high priority or low priority can be given to a request from a particular client.

For example, the IP address of the host of the manager is registered in advance in the load control device. Next, when the load control device receives a request and this request is a request from the registered host, the request is stored in a high-priority class. By dosing so, access from the manager to the server can be protected.

Classification of requests into classes based on User-Agent field: When the server is a Web server, a client can include the User-Agent field in the header of a request based on the HTTP protocol.

The User-Agent field stores information on a client application that has issued a request. So, the load control device can classify requests into classes according to the type of User-Agent, specified by the received requests, to give high priority to requests from a client that uses the browser specifically provided for the Web services or to give low priority to requests issued automatically by a search robot.

Classification of requests into classes based on user ID: To identify a client, the Web server can issue a user ID according to a client and instruct the client to include the user ID, issued to the client, in an HTTP request. This user ID may be included in the Cookie field, URL query, or the body of a request. So, the user ID of a client to which high priority (or low priority) is to be given is registered in advance in the load control device. Next, a class is selected according to whether or not the user ID included in an HTTP request matches any of the registered user IDs. By doing so, high priority is given to a request from a client that has paid an additional charge or, conversely, low priority is given to a client on the black list.

(Classification of Requests into Classes Based on Content of Requests)

A class, in which a request is to be stored, is selected according to whether or not the content of the header or an arbitrary position (for example, the Request-Line or a field when the request is an HTTP request) of a request matches an arbitrary pattern or whether or not an arbitrary variable in the request exceeds a threshold. Examples when the HTTP protocol is used are given below. In the examples below, a pattern is described as a regular expression enclosed by " ".

Classification of requests into classes based on method: HTTP provides multiple methods according to the content of operation on the resources. For example, the GET method is used to acquire resources, and the POST method is used to send data to a server. In important processing such as the online shopping or personal information update, user-entered information must be sent to the server and, in this case, the POST method, not the GET method, is used. In HTTP, a method name is specified in the Request-Line in a request. Therefore, by classifying a request whose method name in the Request-Line matches the pattern "POST" into a high-priority class, high priority can be given to a request with high degree of importance.

Classification of requests into classes based on file type: It is sometimes desired that low priority be given to a request for heavy-load processing such as the processing of a dynamic content. Whether the content is a dynamic content or a static content can be identified by a requested file name. For example, CGI is used as a dynamic content, the suffix of the requested file name is .cgi. So, to give low priority to CGI, a request for a file, whose URL included in the request matches the pattern ".cgi", should be classified into a low-priority class.

Classification of requests into classes based on file size: To give low priority to a request that tries to upload a file of an extremely large size, a threshold should be set as the value of the Content-Length field, which is included in the HTTP header to indicate the request size, so that a request exceeding the threshold should be classified into a low priority class.

(Classification of Requests into Classes Based on Whether Requests are Encrypted)

A request class is selected according to whether or not a request is encrypted. In general, a request that is sent in an encrypted form includes information more important than that included in a request is sent in an unencrypted form. So, an encrypted request is classified into a high-priority class to protect an important request. For example, the Web services allow a client to select one of two types of request sending methods: unencrypted HTTP communication and encrypted HTTPS communication.

At this time, whether the communication is the HTTP communication or HTTPS communication can be identified by the port number to which the TCP connection is connected. So, to give high priority to an encrypted request, a request should be classified into a high-priority class if it is sent via a TCP connection connected to the port for HTTPS communication.

(Classification of Requests into Classes Based on Progress Status of Page Processing)

In Web services, multiple requests are sometimes required until the browser of a client displays one page. In this specification, the repetition of requests for displaying one page is called page processing. The basic progress procedure for page processing is as follows. First, a client enters the URL of the resource, which is the root of the pages to be acquired (hereinafter called page root resource), into the browser.

Next, based on the entered URL, the browser sends a request to the Web server to acquire the page root resource.

At this time, the page root resource indicates the URLs of other resources required for displaying the page. Next, the browser automatically issues a request to an indicated URL. The browser recursively repeats this processing until all resources required for displaying the page are acquired. The following shows examples of the classification of requests into classes based on the progress of page processing.

Classification of requests into classes based on URLs: When the server is congested, giving high priority to requests for resources required for displaying a page allows the services to be provided to more clients in the minimum page configuration. For example, in the Web server, the resource required for displaying the page and the resource not required for displaying the page are saved in different directories in the Web server. Using "classification of requests into classes based on content of requests" described above, the load control device classifies requests for the resources, which are below the directory in which the resources required for displaying the page are saved, into a high-priority class.

Classification of requests into classes based on whether the request is a request for a page root resource: By classifying a request for a page root resource into a low-priority class, high priority is given to already-started page processing. Doing so solves the problem that a request, which is performing page processing when the server is congested, fails during the processing with the result that an incomplete page is displayed on the browser of the client. Especially, when the above-described Priority Queuing is used as the algorithm for scheduling requests in the buffer, a request for a page root resource is not processed as long as a request that is performing page processing is in the buffer. Therefore, when the server is congested, the start of new page processing can be blocked efficiently.

The method for giving low priority to a request for a page root resource is as follows.

Whether the request is the first request sent via a TCP connection: In HTTP1.1, multiple requests/responses can be sent and received via one TCP connection. Because of this, when the browser automatically sends a request for displaying a page, the TCP connection used to acquire the page root resource is usually reused.

Therefore, the page processing in progress can be protected by classifying the second and the following requests after the connection of the TCP connection into a high-priority class. In addition, the browser can establish multiple connections with the same server to receive the resource for displaying a page in parallel via multiple connections. For this reason, even if a request is the first the request after the TCP connection is established, the request may exceptionally be classified into a high-priority class if there is a TCP connection already established from the same client to the server (or load control device).

The actual execution procedure performed by the load control device is as follows.
1) When a response is received from the server, the load control device adds identification information on the client, to which the response is returned, to the table (client identification information table). If the identification information on the client is already included in the table, this step may be omitted.
2) When a request is received, the load control device references the client identification information table.
3) If the identification information on the client, from which the request is received, is included in the table, the load control device classifies the request into a high-priority class.

On the other hand, if the identification information on the client is not included in the table, the load control device classifies the request into a low-priority class.
4) When all TCP connections connected from the same client are disconnected, the load control device deletes the identification information on the client from the client identification information table.

Registration of the URLs of page root resources: The list of the URLs of page root resources is registered in advance in the load control device. And, the requests are classified into classes using "classification of requests into classes based on content of requests" described above. That is, when a request is received, the load control device first compares the URL of the request with the URLs in the table. If the URL of the request matches the URL of one of the page root resources, the load control device classifies the request into a low-priority class.

Caching of URL: If a response returned from the server includes the URL of a resource to be automatically acquired by the browser, the URL is cached for a fixed time to give priority to a request for the URL. In the HTTP protocol, a URL to be automatically acquired by the browser is specified by the Src tag in an HTML file. Therefore, the execution procedure performed by the load control device is as follows.
1) If the file type of a response is an HTML file, the load control device searches the content for a character string that matches the pattern "Src=".
2) Next, if there is a character string that matches the pattern "Src=", the load control device extracts the URL that follows the pattern "Src=".
3) The load control device stores a set of the extracted URL and the client identification information on the client, to which the response is sent, in the cache for a fixed time.
4) The load control device classifies the request into a high-priority class if a request for the cached URL is received from a cached client, using both "classification of requests into classes based on sending client identification information" and "classification of requests into classes based on content of requests" described above.

(Classification of Requests into Classes Based on Progress Status of Session Processing)

In Web services, one service is completed by browsing, or entering information into, multiple pages in some cases. For example, the purchase procedure of online shopping is completed by selecting an item a client wants to buy, entering the client information and, finally, confirming the purchase content. In this specification, the period of time from the moment a client acquires the first page of a service, which outputs multiple pages until the service is completed, to the moment the client acquires and completes the last page is called a session.

A session is used to perform important processing such as the transaction of money and goods or the update of personal information. The problem is that most of the sessions are not completed when the server is congested. This is because, as the number of sessions processed in parallel on the server is increased, a server resource conflict occurs among the sessions and many sessions fail during the processing. To solve this problem, the load control device classifies requests into classes based on the progress status of sessions to which requests belong so that high throughput is maintained even when the server is congested.

To perform session processing, the Web server must identify to which session a received request belongs. For this reason, session identification information, such as a session ID, is used in the session processing. For example, when a request for the first page of a session is received, the Web server issues a session ID, which is unique among sessions, and returns the session ID, as well as a response, to the client. A typical Web server stores a session ID in the Set-Cookie field of an HTTP response. Next, the client sends a request, which includes the session ID received from the server, to the server. At this time, if the session ID was notified via the Set-Cookie field of the response, the session ID is stored in the Cookie field of the request. The Web server identifies the session, to which the request belongs, via the session ID included in the request.

As described above, the RTSP used by a streaming server provides the concept of a session as the standard feature. That is, when a session is started by the SETUP request, a session ID is issued and attached to the subsequent requests/responses. In RTSP, a session ID is stored in the Session field of the RTSP header.

First, the load control device in this embodiment evaluates the progress status of a session, to which a request belongs, using the session ID in the request as the key. For example, when priority is to be given to all requests belonging to an already-started session, the load control device checks the presence/absence of the Cookie field of a request if the HTTP protocol is used, or the Session field of a request if the RTSP protocol is used, to determine if a session ID is included in the request. And, the load control device classifies the requests, which include the session ID, into a high-priority class. Doing so allows the server to processes an already-started session with priority given to it. In particular, when Priority Queuing described above is used as the algorithm for scheduling the requests in the buffer, a request to start a new session is not processed as long as the buffer stores requests belonging to an already-started session that is in progress. Therefore, this method efficiently blocks the start of the processing of a new session when the server is congested.

In addition, the validity of a session ID may be verified for avoiding the use of an invalid session ID by a malicious client. The following describes the execution procedure performed by the load control device.
1) The load control device checks a response from the server for the Set-Cookie field if the HTTP protocol is used, or the Session field if the RTSP protocol is used, to determine if a new session ID is issued.
2) If a new session ID is issued, the load control device stores the session ID in the cache for a fixed time.
3) The load control device verifies if a session ID is included in a received request.
4) If a session ID is included in the request, the load control device verifies if the session ID matches any of the session IDs stored in the cache.
5) If the session ID does not match any of the session IDs, the session ID included in the request is invalid and so the request need not be classified into a high-priority class.

To prevent a session ID from being leaked from the cache, the session ID of a request, if not found in the cache, may be re-registered in the cache when the server processes the request.

The client identification information such as the source IP address and the user ID of a request may be used as the session identification information stored in the cache. For example, instead of a session ID, the IP address of a client whose request was processed by the server is stored in the cache to give high priority to a started session on a source IP address basis. The following shows an example of this method.
1) The load control device stores the IP address of a client, to which a response received from the server is sent, in the cache for a fixed time.
2) The load control device verifies if the source IP address of a received request matches one of the session IDs stored in the cache. If a match occurs, the load control device classifies the request into a high-priority class assuming that the request is received from a client to which approval to start processing in the server has been given.

As compared with the method in which a session ID is used, this method has a disadvantage in that high priority is given to a session to which high priority need not be given. For example, when multiple clients access the load control device via the same proxy, the source IP addresses of the requests received by the load control device are all the IP address of the proxy.

Because of this, when one of the clients that access the same proxy has started processing, all requests from the other clients are classified also into a high-priority class. On the other hand, the advantage of using the source IP address is that the calculation cost is reduced and the setting is easy.

The cached copy of session identification information may be used for "Classification of requests into classes based on whether the request is a request for a page root resource" described in the above-described Classification of requests into classes based on progress status of page processing. That is, page processing is thought of as special session processing that is completed in one page. Hence, the period of time during which session identification information is stored in the cache is limited to the time required for completing the processing of one page (typically, several seconds). Limiting the period of time in this way erases the session identification information in the cache before a client accesses a new page. As a result, a request for the page root resource of a new page is classified into a low-priority class because the session identification information is not stored in the cache. By re-registering the session identification information in the cache after the request for the page root resource is processed by the server, the request for the remaining resources required for displaying the page can be classified into a high-priority class.

The session progress status may be evaluated based, not on the session ID, but on the URL of a request. For example, the resources of the pages making up a session are saved in advance in different directories, one directory for each page, in the Web server. By saving the resources in this way, the page to which the resources requested by a request belong can be identified by the directory indicated by the URL of the request. Thus, the load control device can use the above-described "Classification of requests into classes based on content of requests" to classify requests into classes based on a page to which the requested resources belong. At this time, the sooner a page is used after the session is started, the lower is the priority set for the page.

When the server is an RTSP-based streaming server, the session progress status may be evaluated based on a method specified by the request. As described above, RTSP provides the methods such as SETUP, PLAY, and TEARDOWN according to the control content of a stream. Those methods can be classified into those used before establishing a session and those used after establishing a session.

Therefore, a request specifying a method, which is used after establishing a session, can be classified into a high-priority class to give priority to an established session. FIG. 9 shows an example of methods used by RTSP and classes in which those methods are classified.

(Classification of Requests into Classes Based on Degree of Suspicion of Unauthorized Access)

The computation resource of a server is sometimes occupied by an unauthorized access made by a malicious client. To avoid this problem, the load control device in this embodiment may have the intrusion detection function, which detects traffic suspected of unauthorized access, for classifying a request, which is likely to be an unauthorized access, into a low-priority class. In addition, this classification method may be combined with "Classification of requests into classes based on client identification information" to give low priority to a client, which has sent traffic that is likely to be an unauthorized access, for a fixed period of time. That is,
1) The load control device evaluates the likelihood that the traffic being received is an unauthorized access.
2) The load control device records identification information on the source of traffic, which is determined likely to be an unauthorized access, for a fixed period of time.
3) When a request is received, the load control device checks if the identification information on the client matches the recorded identification information.
4) If they match, the load control device classifies the request into a low-priority class.

The intrusion detection function may be implemented as an external device of the load control device by connecting the load control device and an existing intrusion detection device (IDS: Intrusion Diction System). In this case, information on unauthorized access, that is, the type of unauthorized access and the identification information on the sending-source client, is sent from the intrusion detection device to the load control device as an alert. The load control device performs priority control for the request based on the alert.

Classifying a request, which is likely to be an unauthorized access, into a low-priority class in this way allows priority to be given to the processing of a request, which is likely to be normal, when the server is congested. A device that performs similar unauthorized access control is an intrusion prevention system. An intrusion prevention system discards traffic immediately after the traffic is determined to be an unauthorized access. Because of this, an intrusion prevention system has an incorrect-control problem generated by mistakenly determining a normal request as an unauthorized request and, as a result, improperly controlling the normal request. In contrast, the present invention relieves an incorrect-control problem generated in an intrusion prevention system because a request that is likely to be an unauthorized access is processed also on the server unless the server is congested.

In the first example, the threshold of the number of response-waiting requests is given statically. However, manually setting the threshold of the number of response-waiting requests gives a heavy load on the manager of the load control device 3 as described above. To solve this problem, the first example is extended to allow the threshold of the number of response-waiting requests to be dynamically set so that a) the processing performance of the server 4 can be maximized and b) the response time falls within the allowable range.

The following shows examples in which the number of response-waiting requests is automatically adjusted.
(First Example of Automatic Adjustment)

The (average) number of requests N waiting in the buffer and the (average) response time T from the time the load control device 3 sends a request to the server 4 to the time the load control device 3 receives a response are measured regularly. LN and LT are defined as the thresholds for N and T. At this time, if N<LN, it is assumed that the number of response-waiting requests is smaller than the threshold because the amount of requests is small. If T<LT, it is assumed that a proper response is returned. Therefore If T≥LT, the threshold of the number of response-waiting requests is decreased.
T<LT
If—N≥LN, the threshold of the number of response-waiting requests is increased.
If—N<LN, the threshold of the number of response-waiting requests is not changed.
(Second Example of Automatic Adjustment)

The (average) number of requests N waiting in the buffer and the response time T from the time the load control device 3 returns a request to the server 4 to the time the load control device 3 receives a response are measured regularly. LN and LT are defined as the thresholds for N and T. In addition, let r be the rate of requests satisfying the relation T>LT. At this time, using the constant k (0≤k≤1), If r≥k, the threshold of the number of response-waiting requests is decreased.
r<k
If—N≥LN, the threshold of the number of response-waiting requests is increased.
If—N<LN, the threshold of the number of response-waiting requests is not changed.
(Third Example of Automatic Adjustment)

The (average) number of requests N waiting in the buffer and the CPU usage rate U of the server 4 are measured regularly. LN and LU are defined as the thresholds of N and L.

If U≥LU, the threshold of the number of response-waiting requests is decreased.
U<LU
If—N≥LN, the threshold of the number of response-waiting requests is increased.
If—N<LN, the threshold of the number of response-waiting requests is not changed.

Not only the CPU usage rate but also the memory usage rate, bandwidth, and degree of parallelism may be monitored to use its maximum value as U.
(Fourth Example of Automatic Adjustment)

The (average) number of requests N waiting in the buffer and the throughput T that is the number of requests that the server 4 could process per unit time are measured regularly. Let R be the threshold of the current number of response-waiting requests. In addition, the throughput is measured so that it can be recorded for each threshold R of the number of response-waiting requests.

In the following description, the throughput for the threshold R of the number of response-waiting requests is described as T[R]. LN is defined for the threshold of the number of requests N in the buffer. In this case, the following is performed according to the measured N and T.
1) If N<LN, this relation indicates that the number of response-waiting requests is smaller than the threshold. So, the threshold of the number of response-waiting requests is not updated and the processing is terminated. If N≥LN, 2) is performed.
2) The throughput T[R] for the threshold of the current number of response-waiting requests is updated using T. Next, 3) is performed.
3) The throughput T [R] for the threshold R of the current number of response-waiting requests is compared with the throughput T [R'] (R'<R) that is the throughput when the threshold is smaller.
A) If T[R]≥k1×T[R']: This relation indicates that the throughput is increased by an increase in the threshold of the number of response-waiting requests. Therefore, the threshold of the number of response-waiting requests is further increased. In this case, k1 is a constant where k1≥1.0.

B) If T[R]≤k2×T[R']: This relation indicates that the throughput is decreased by an increase in the threshold of the number of response-waiting requests. Therefore, the threshold of the number of response-waiting requests is decreased. In this case, k2 is a constant where k2≤1.0.

C) In cases other than those described above, the threshold of the number of response-waiting requests is not changed.

In the present invention, whether or not the number of response-waiting requests has reached its threshold is determined based on the number of waiting requests in the buffer. If it is determined that the number of response-waiting requests has reached the threshold, whether or not the threshold of the number of response-waiting requests should be increased is determined.

This method solves the problem that the threshold of the number of response-waiting requests will be increased without limitation when the load on the server 4 is not so heavy. In the examples described above, the threshold of the number of response-waiting requests is not changed when N<LN, that is, when the number of response-waiting requests is smaller than the threshold. However, the threshold of the number of response-waiting requests may be decreased when N<LN.

In the above examples, with the maximum value and the minimum value of the threshold defined for the number of response-waiting requests, it is possible not to make the modification if the threshold of the number of response-waiting requests after the modification is out of this range.

Second Embodiment

Figure 10:
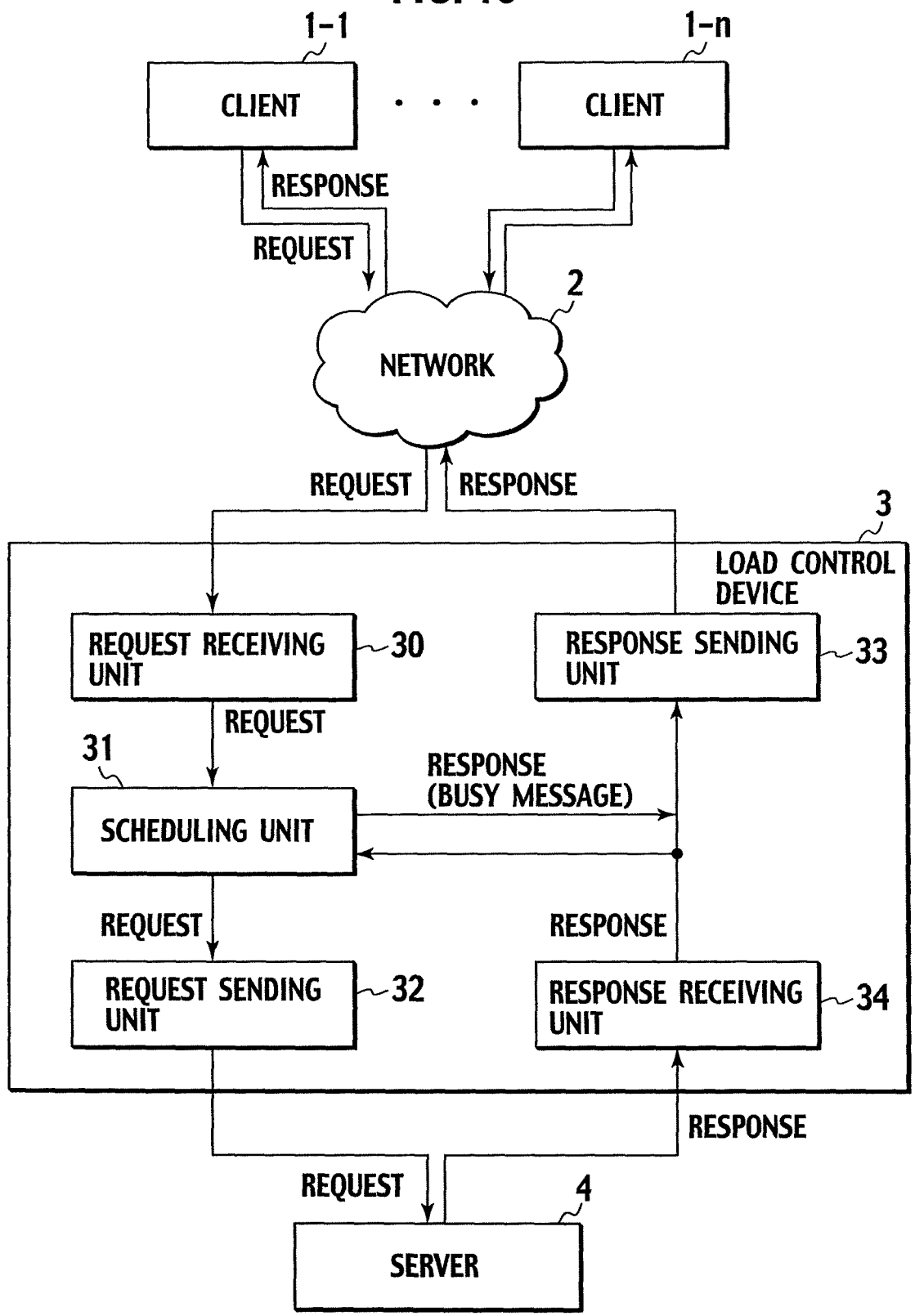
FIG. 10 is a block diagram showing the configuration of a load control device in a second embodiment.

Next, a second embodiment will be described in which TCP/IP (Transfer Control Protocol/Internet Protocol) widely used on the Internet is used as the protocol for sending and receiving requests and responses. FIG. 10 is a block diagram showing the second embodiment of the present invention. This embodiment comprises clients 1-1 to 1-$n$ that issue requests, a server 4 that returns a response corresponding to a request, and a load control device 3 that relays requests and responses. The load control device 3 may be created by extending the existing technologies, such as a reverse Proxy, a Web accelerator, a Firewall, and a load balancer.

A load control system in this embodiment comprises the following seven functional blocks.

Request receiving unit 30
Request sending unit 32
Response receiving unit 34
Response sending unit 33
Scheduling unit 31

Figure 11:
FIG. 11 is a flowchart showing the processing procedure of a request receiving unit in the second embodiment.

The request receiving unit 30 sends a request, received from the clients 1-1 to 1-$n$, to the scheduling unit 31. FIG. 11 shows the processing procedure of the request receiving unit 30. First, when a new TCP connection is established from the clients 1-1 to 1-$n$ (S30), a socket is generated for sending and receiving a request and a response between the clients 1-1 to 1-$n$ and the load control device 3 (S31). An ID (socket ID) uniquely identifying the socket is assigned to the generated socket.

Next, the request receiving unit 30 selects one client side socket (S32) and checks the client side socket (S33). If the result of the checking indicates that a new request is included in the socket (S34), the request receiving unit 30 performs request reception processing for reading the request from the selected socket (S35). Each time a request is read, a request ID identifying the request uniquely is attached to the read request.

Next, to maintain the relation between requests and client side sockets, the request receiving unit 30 registers the set of the request ID and the socket ID in the request table shown in FIG. 12 (S36). Finally, the received request is sent to the scheduling unit 31 (S37).

If the result of the client side socket checking (S33) indicates that a new request is not included in the socket (S34), the request receiving unit 30 selects one next client side socket (S32) that is the next and repeats the processing (S33-S37) (S38).

In addition, in parallel with the reading of a request, the request receiving unit 30 checks if the TCP connection is disconnected due to a factor such as a timeout (S39). If the connection is disconnected, the request receiving unit 30 discards the socket (S40).

Figure 13:
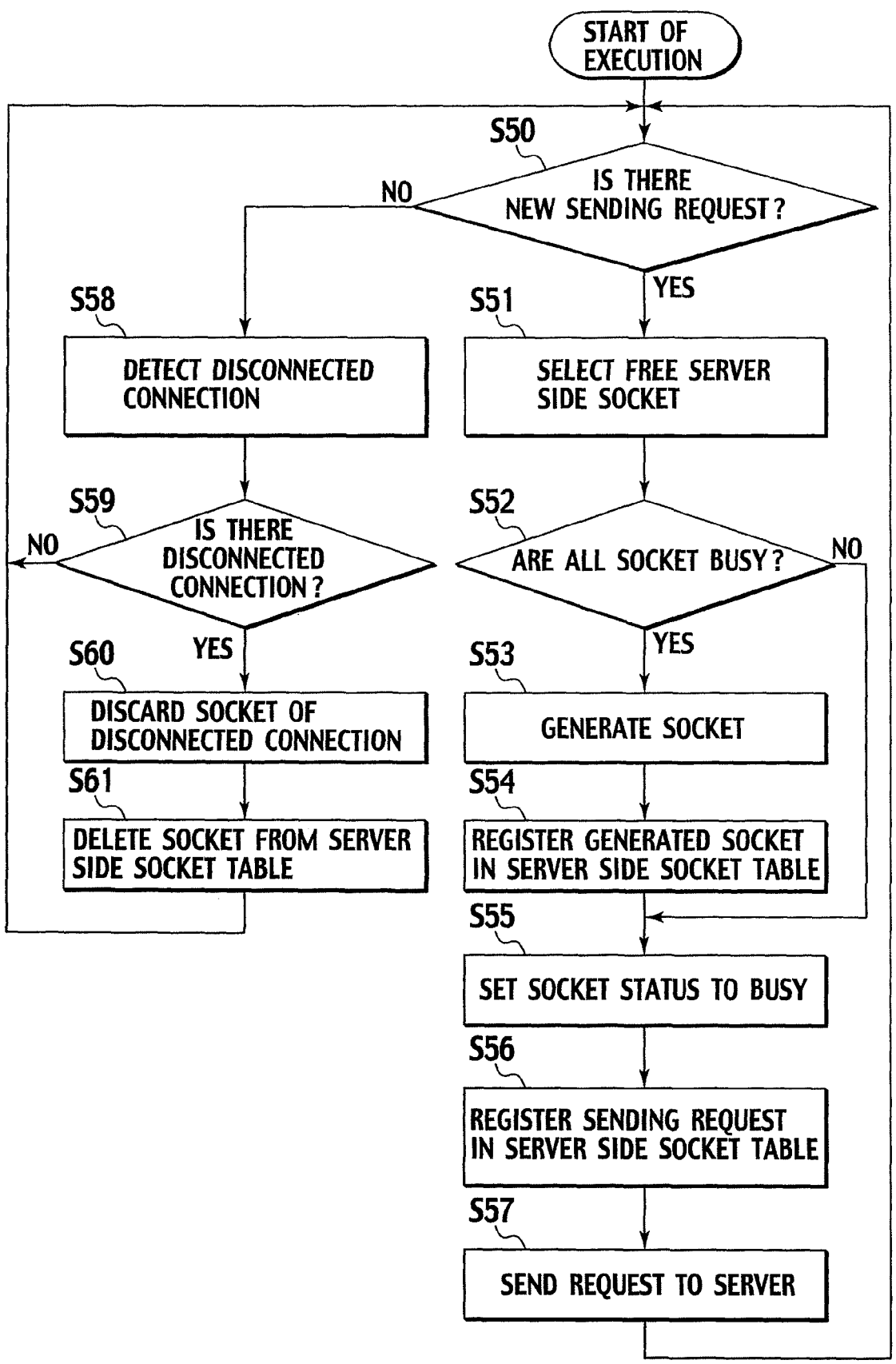
FIG. 13 is a flowchart showing the processing procedure of a request sending unit in the second embodiment.

The request sending unit 32 manages sockets for sending requests from the load control device 3 to the server 4 and performs request sending processing. FIG. 13 shows the processing procedure of the request sending unit 32. When a new sending request is received from the scheduling unit 31 (S50), the request sending unit 32 references the server side socket table shown in FIG. 14 and searches the table for a free socket for use in communication with the sending destination server 4 (S51). Here, a free socket refers to a socket for which a TCP connection between the load control device 3 and the sending destination server 4 is established and all responses corresponding to a request that was sent to the server 4 have been received.

If a free socket is detected (S52), the request sending unit 32 selects the socket as a socket for sending the request. If there is no free socket (S52), the request sending unit 32 establishes a new TCP connection with the sending destination server 4 and generates a socket for sending the request (S53). At this time, a unique ID is assigned to the socket. The request sending unit 32 registers the ID of the generated socket in the server side socket table (S54) and sets its status to free. After selecting a free socket, the request sending unit 32 registers the request ID in the server side socket table (S56). At this time, the status of the socket is changed from free to busy (S55). Finally, the request sending unit 32 sends the request to the server 4 (S57).

The request sending unit 32 constantly monitors and detects if there is a TCP connection that is disconnected due to a timeout and so on (S58). If a disconnected TCP connection is detected (S59), the request sending unit 32 discards the corresponding socket (S60) and deletes it from the server side socket table (S61).

As in this embodiment, the present invention reuses a free socket (connection aggregation) when a request is sent irrespective of its sending client. Connection aggregation allows the load control device 3 side to adjust the number of TCP connections between the server 4 and the load control device 3 so that it does not exceed the number of clients. Therefore, the number of server side sockets never exceeds the threshold of the number of response-waiting requests. So, if the threshold of the number of response-waiting requests is smaller than the limit of the number of TCP connections, the sending of a request is not blocked by the limit of the number of TCP connections.

In the example in FIG. 13, the number of requests that can be sent to the server 4 at the same time via one socket is 1. Instead of this, it is also possible to continuously send multiple requests via one socket without waiting for a response to be returned. Continuously sending multiple requests to the server 4 via one socket can reduce the overhead of socket generation or discarding.

Figure 15:
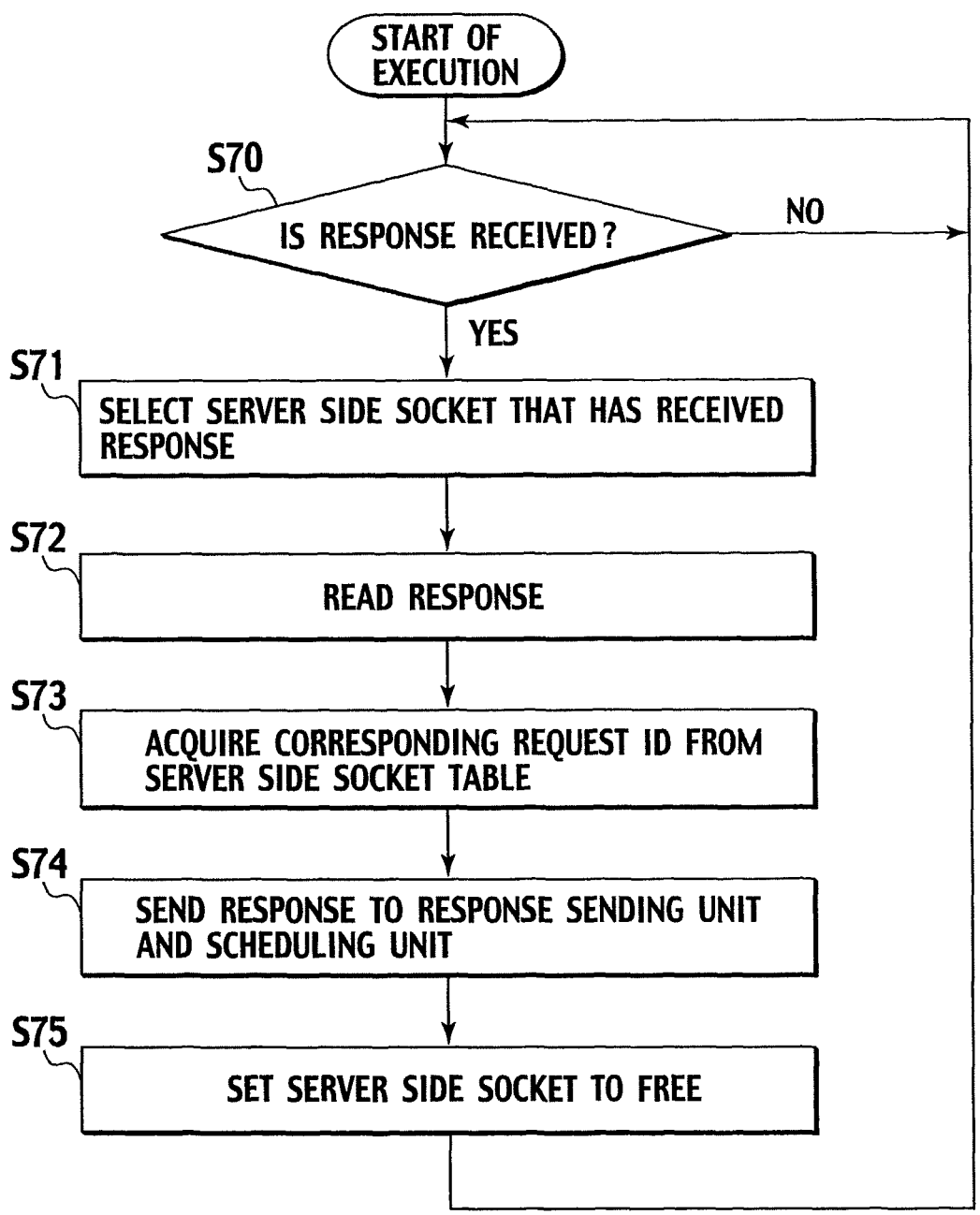
FIG. 15 is a flowchart showing the processing procedure of a response receiving unit in the second embodiment.

FIG. 15 shows the processing procedure of the response receiving unit 34. The response receiving unit 34 receives a response returned from the server 4 (S70). Next, the response receiving unit 34 references the server side socket table for selecting the server side socket that has received the response (S71). Next, the response receiving unit 34 reads the response (S72) and acquires the corresponding request ID from the IDs stored in the server side socket table (S73). As the received response ID, the response receiving unit 34 assigns the same ID as that of the corresponding request. Next, the response receiving unit 34 sends the response to the scheduling unit 31 and the response sending unit 33 (S74). Finally, the response receiving unit 34 changes the status of the socket from busy to free so that the next request can be sent via the socket (S75)

Figure 16:
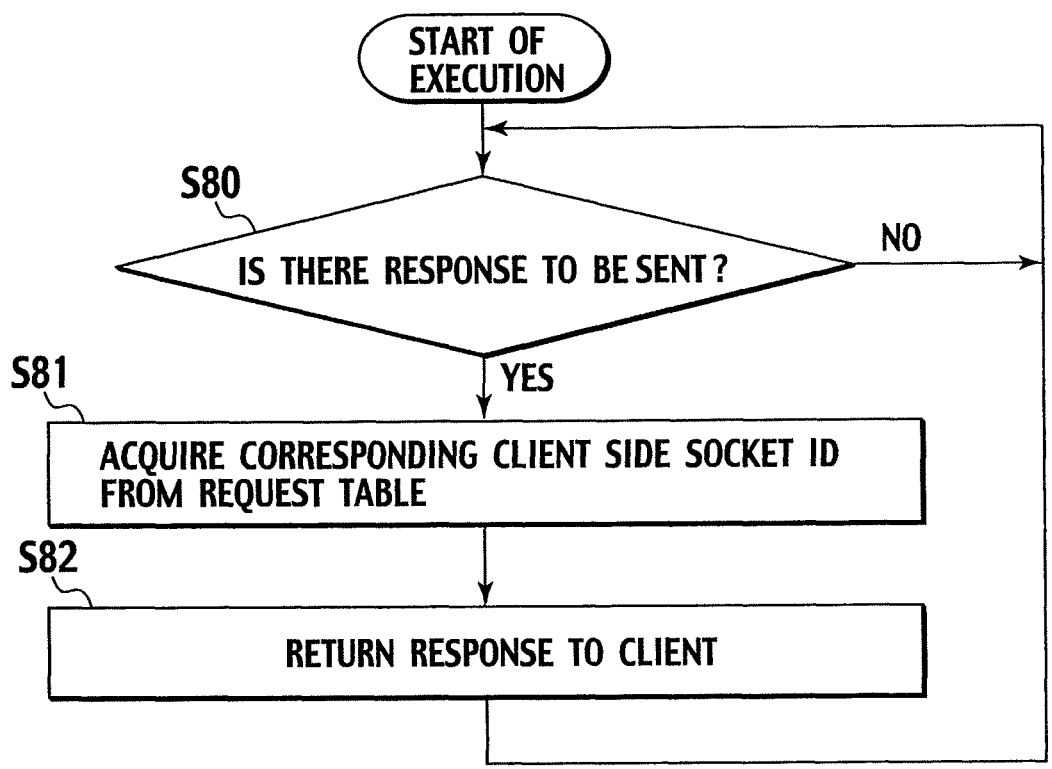
FIG. 16 is a flowchart showing the processing procedure of a response sending unit in the second embodiment.

FIG. 16 shows the processing procedure of the response sending unit 33. When a response is received (S80), the response sending unit 33 references the request table based on the response ID (same as request ID), acquires the client side socket ID connected to the client to which the response is to be returned (S81), and selects the client side socket. Next, the response sending unit 33 writes the response in the socket to return the response to the client (S82).

As in the first embodiment, the scheduling unit 31 stores a received request in the buffer. If the number of response-waiting requests is lower than the threshold, the scheduling unit 31 selects a request from those stored in the buffer and sends the selected request to the server 4.

Figure 17:
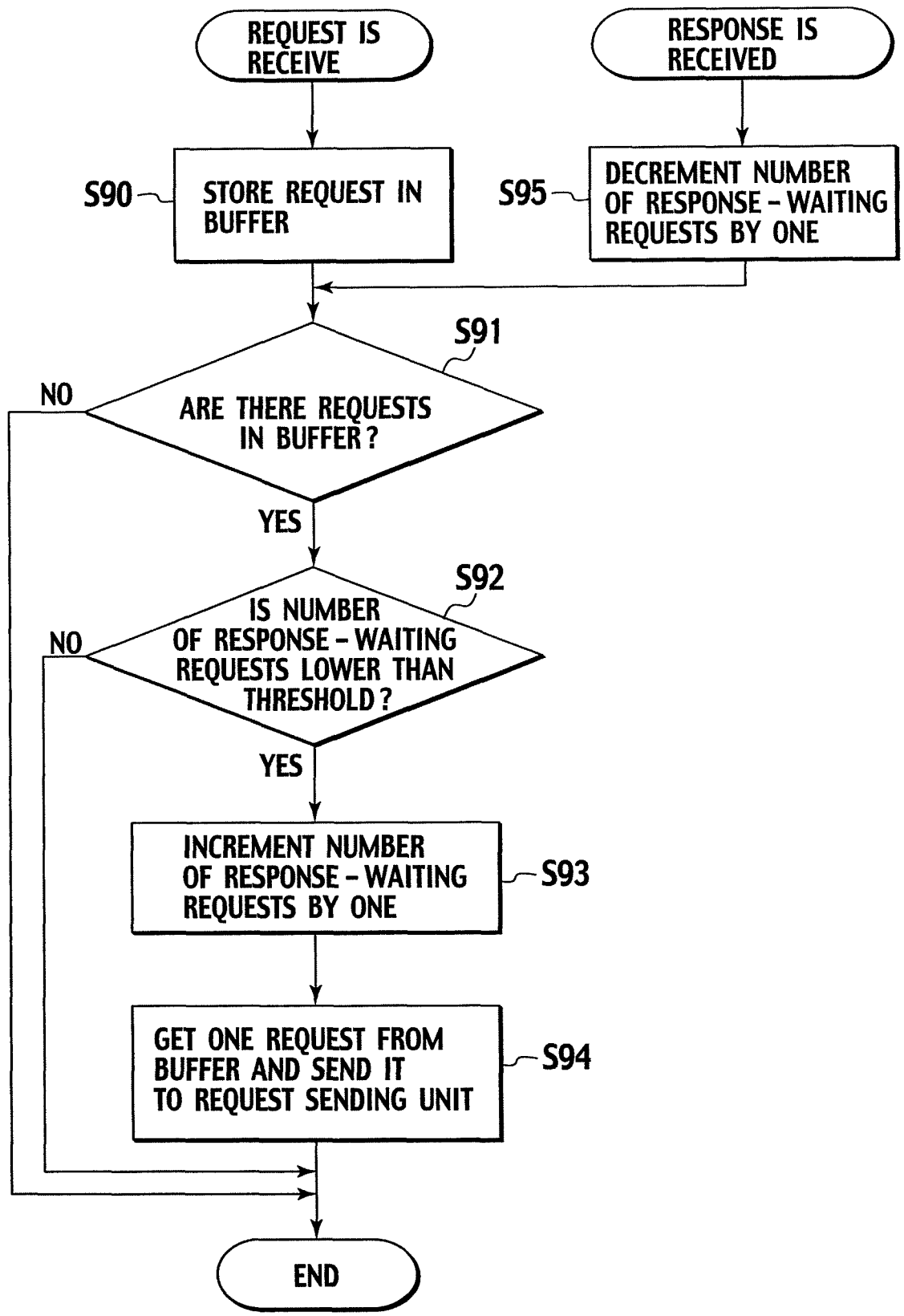
FIG. 17 is a flowchart showing the processing procedure of a scheduling unit in the second embodiment.

FIG. 17 shows the processing procedure of the scheduling unit 31. When a request is received, the scheduling unit 31 first stores the request in the buffer (S90). Next, the scheduling unit 31 checks if there are requests in the buffer that are waiting to be sent (S91). If there are requests waiting to be sent, the scheduling unit 31 checks if the current number of response-waiting requests exceeds the threshold (S92). If the threshold is exceeded, the scheduling unit 31 terminates the processing. If the number of requests being sent is smaller than the threshold, the number of response-waiting requests is increased by one (S93). Next, the scheduling unit 31 gets one request from the buffer and sends it to the request sending unit 32 (S94).

On the other hand, when a response is received, the number of response-waiting requests is decreased by one so that the next request can be sent (S95). The subsequent processing is the same as when a request is received, and step S91 in FIG. 17 "Are there requests in buffer?" and the following steps are executed.

Although one server is used in the examples described above, multiple servers may also be used. When multiple servers are used, multiple copies of the scheduling unit 31, the response sending unit 33, and the response receiving unit 34 are created, one for each server. The request receiving unit 30 distributes requests to the processing units of each server according to the destination.

To show the effect of the present invention, the load control device 3 of the present invention is installed in the PC (Personal Computer) for experimentally performing evaluation. The evaluation is made by comparing the throughput (request per second: rps) of the Web server when the load control device 3 of the present invention is installed with the throughput (rps) of the Web server when the load control device 3 of the present invention is not installed while varying the input request rate (rps) from the clients 1-1 to 1-$n$ to the server 4.

Figures 18, 19:
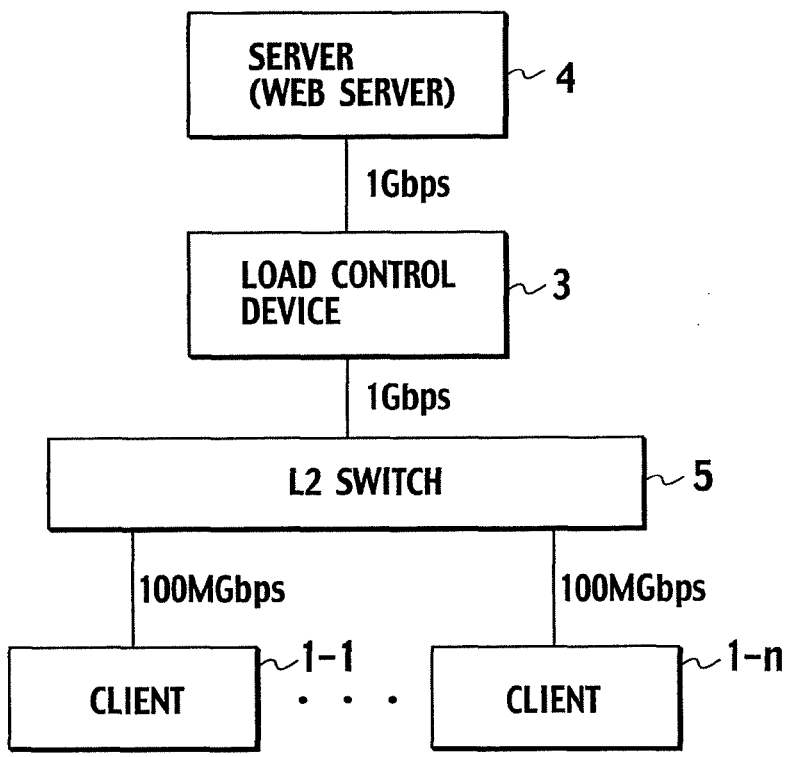
FIG. 18 is a diagram showing the configuration of an experiment that shows the effect of the present invention.
FIG. 19 is a diagram showing the configuration table of a server and a load control device for the experiment.

FIG. 18 shows the configuration of the experiment. As shown in FIG. 18, the clients 1-1 to 1-$n$ and the server 4 (Web server) communicate via an L2 switch 5 and the load control device 3. The bandwidth of the networks (not shown) between the server 4 and the load control device 3 and between the load control device 3 and the L2 switch 5 is 1 Gbps. On the other hand, the bandwidth of the network (not shown) between the clients 1-1 to 1-$n$ and the L2 switch 5 is 100 Mbps. FIG. 19 shows the configuration of the server 4 and the load control device 3. In this experiment, the threshold of the number of response-waiting requests in the load control device 3 is fixed at "10".

To compare with the conventional load control method, the upper limit of the number of TCP connections to which the server 4 can connect simultaneously is set to 150. The timeout time from the time the clients 1-1 to 1-$n$ send a request to the time the clients receive a response is set to 10 seconds. When the timeout is reached, the clients 1-1 to 1-$n$ disconnect the TCP connection and cancel the request.

Figures 20, 21:
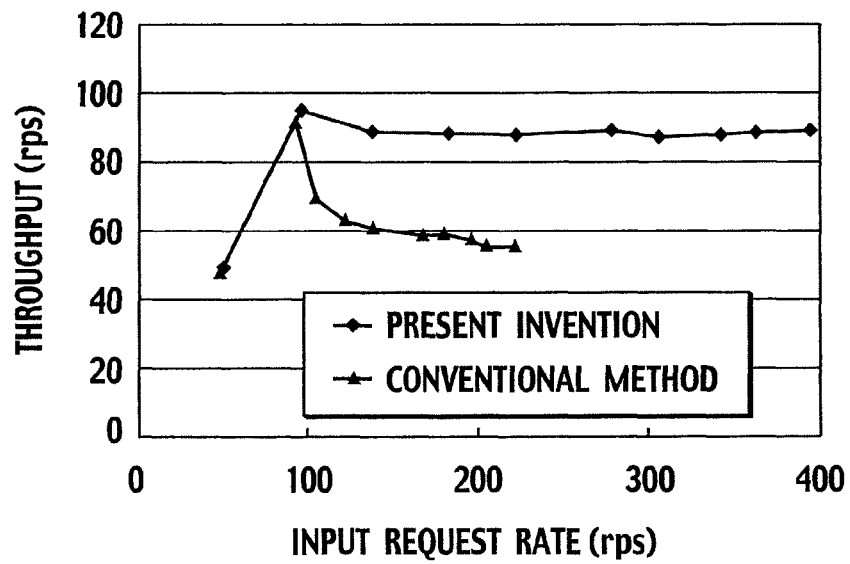
FIG. 20 is a diagram showing the effect of the present invention.
FIG. 21 is a diagram showing the configuration table of a server and a load control device for the experiment that shows the effect of the automatic adjustment of the threshold of the number of response-waiting requests of the present invention.

FIG. 20 shows the experiment result. In FIG. 20, the horizontal axis indicates the input request rate, and the vertical axis indicates the throughput. FIG. 20 shows the change in the throughput (rps) of the server 4 for the input request rate (rps) of requests from the clients 1-1 to 1-$n$. The "present invention" in FIG. 20 indicates the result when the load control device 3 is provided, and the "conventional method" indicates the result when the server 4 and the clients 1-1 to 1-$n$ are connected not via the load control device 3.

FIG. 20 indicates that, when the input request rate is equal to or lower than 100 rps, the throughput of the server 4 increases in proportion to the input request rate whether the load control device 3 is provided or not. However, when the input request rate exceeds 100 rps, the decrease in throughput becomes apparent when the load control device 3 is not provided. For example, when the input rate is 200 rps, the throughput is about 60% of the peak-time throughput.

On the other hand, when the load control device 3 of the present invention is used, the throughput can be maintained at 90% of the peak-time throughput or higher even when the input request rate becomes higher than 100 rps. The result described above shows the effectiveness of the load control device 3 of the present invention.

Next, the following describes the effect of automatically adjusting the threshold of the number of response-waiting requests. In this evaluation, the same configuration as that shown in FIG. 18 is used. FIG. 21 shows the detail of the server 4 and the load control device 3 used in this evaluation. In this evaluation, online shopping is assumed as the Web application, and the benchmark software SPEC WEB2005 Ecommerce is used (for example, see http://www.spec.org) This Web application requires about 13 pages until shopping is completed. A program emulating the actual client operation is executed on the client PC.

The client program automatically accesses the Web server and attempts to execute a session. At this time, the client program behaves in the same way as an actual client, that is, the client program takes into consideration the thinking time from the acquisition of one page to the movement to the next page and a timeout that may occur during page reading. When a timeout occurs, the client program attempts to acquire the page again. In addition, the client program goes back to the previous page, or interrupts a session halfway, with a predetermined probability. In this evaluation, an amount of requests exceeding the maximum processing performance of the server 4 is sent to the load control device 3. Next, the throughput, which is the number of requests processed per unit time by the server 4, is measured and compared between when the threshold of the number of response-waiting requests is set statically and when the number of response-waiting requests is adjusted automatically according to the present invention.

Figure 22:
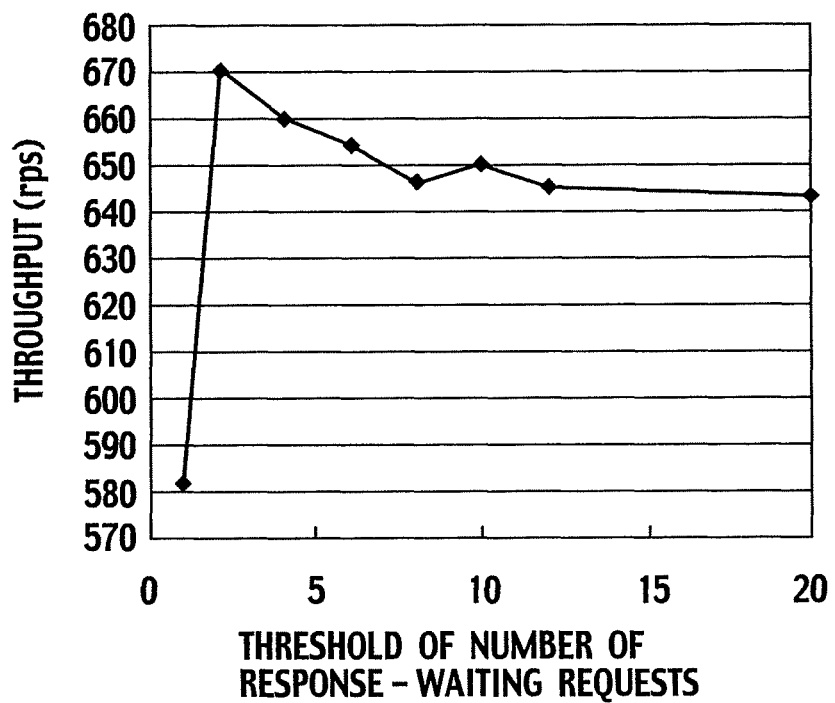
FIG. 22 is a diagram showing a change in throughput for the setting values of the threshold of the number of response-waiting requests.

First, throughput achieved when the threshold of the number of response-waiting requests is set statically is evaluated. FIG. 22 shows the evaluation result. The graph in FIG. 22 shows a change in throughput for the setting value of the threshold of the number of response-waiting requests. That is, the horizontal axis in FIG. 22 indicates the setting value of the threshold of the number of response-waiting requests, and the vertical axis indicates the throughput (rps) of the server 4. The graph in FIG. 22 shows that the throughput of the server 4 reaches the maximum of 671 rps when the threshold of the number of response-waiting requests is "2" and, as the number of response-waiting requests increases, the throughput gradually decreases. This result indicates that, if it is desired to maintain the maximum throughput at the maximum value of 97% or higher, the threshold of the number of response-waiting requests must be set in the range "2" to "6".

Next, the following shows the result obtained by automatically adjusting the threshold of the number of response-waiting requests based on the present invention in accordance with (Fourth example of automatic adjustment) described above. To show the effectiveness of the automatic threshold adjustment method based on the present invention, the following also shows the result obtained by applying the method of automatically adjusting the degree of parallelism on a page basis, shown in Non-Patent Document 1, to the control of the threshold of the number of response-waiting requests. The method of automatically adjusting the degree of parallelism shown in Non-Patent Document 1 is as follows. First, the throughput is measured regularly to determine whether the degree of parallelism is to be increased or decreased. Let Ti be the throughput for the i-th measurement. Let Ci be the degree of parallelism for the i-th measurement. At this time, If $C_i > C_{i-1}$ and $T_i \geq T_{i-1}$, the degree of parallelism is increased.

If $C_i > C_{i-1}$ and $T_i < T_{i-1}$, the degree of parallelism is decreased.

If $C_i < C_{i-1}$ and $T_i \geq T_{i-1}$, the degree of parallelism is decreased.

If $C_i < C_{i-1}$ and $T_i < T_{i-1}$, the degree of parallelism is increased.

That is, if the comparison with the previous measurement result indicates that the throughput is increased, the same operation as the previous operation is performed (degree of parallelism is increased or decreased). Conversely, if the comparison indicates that the throughput is decreased, the operation that is the reverse of the previous operation is performed.

Figure 23:
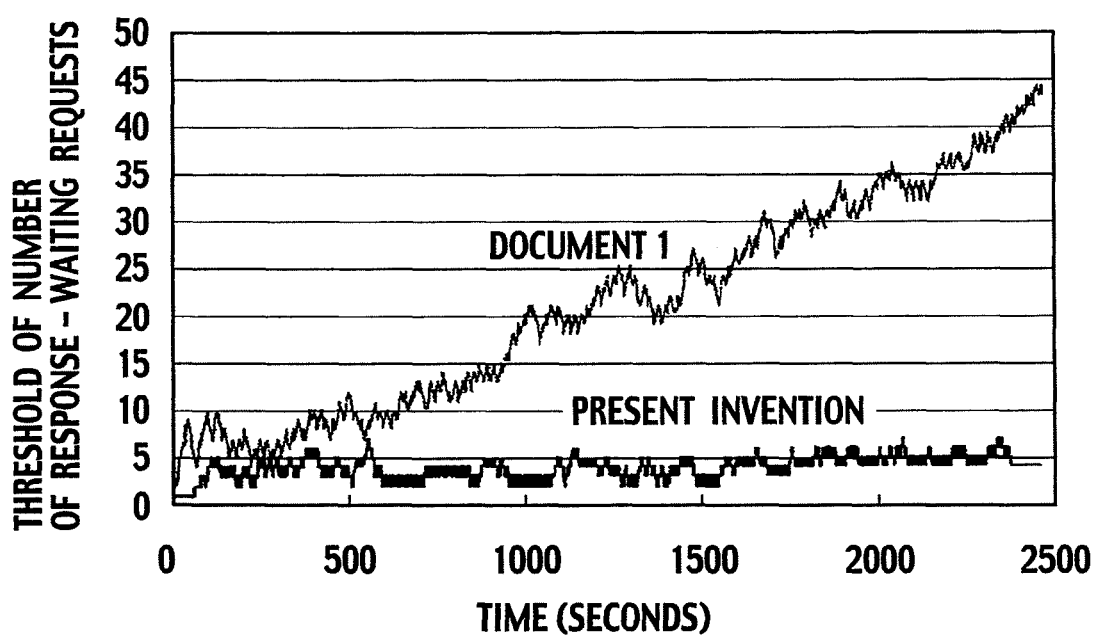
FIG. 23 is a diagram showing the effect of the automatic adjustment of the threshold of the number of response-waiting requests of the present invention.

The graph in FIG. 23 shows a chronological change in the threshold of the number of response-waiting requests. The horizontal axis in FIG. 23 indicates the time (seconds), and the vertical axis indicates the threshold of the number of response-waiting requests. FIG. 23 shows that, if the automatic adjustment method according to the present invention is used, the time during which the threshold of the number of response-waiting requests falls in the range "2" to "6" accounts for 96.9% of the observation time. In addition, the average throughput achieved when automatic adjustment is made according to the present invention is 660 rps, which is 98% of the maximum throughput achieved when the threshold is set statically. On the other hand, FIG. 23 indicates that the number of response-waiting requests is increased abnormally when the method based on Non-Patent Document 1 is used. The following are the factors of such an abnormal increase generated by the method based on Non-Patent Document 1.

(1) In the method based on Non-Patent Document 1, there is no means that checks if the current number of response-waiting requests has reached the threshold. Therefore, when the input request rate for the server is increased gradually, the problem is that the threshold is increased without limitation before the number of response-waiting requests reaches the threshold. In contrast, the present invention solves this problem by not increasing the threshold of the number of response-waiting requests unless the number of requests in the queue reaches a number that is large enough.

(2) In the method based on Non-Patent Document 1, the increase/decrease in the threshold of the number of response-waiting requests is determined by a change in the local throughput that is a result of the comparison between the previous throughput measurement result and the current throughput measurement result. So, for example, when the throughput is temporarily decreased largely and is recovered gradually, the problem is that the threshold of the number of response-waiting requests is increased (or decreased) without limitation regardless of the fact that the throughput is not increased on a long-term basis. In contrast, according to the design described in the fourth example of automatic adjustment of the present invention, the throughput is recorded and compared for each threshold of the number of response-waiting requests so that the threshold is not increased unless the throughput is increased. Also, in the first to third examples of automatic adjustment, the threshold is set for the response time to avoid the problem that the threshold of the number of response-waiting requests is increased without limitation.

Next, as an example of effects of the priority control of requests based on the present invention, the following shows the evaluation result of the classification of requests into classes based on the session progress status. That is, requests are classified based on whether or not an effective session ID is included. Using Priority Queuing, requests including an effective session ID are processed preferentially on the server. In this evaluation, the same configuration as that in FIG. 18 is used. The detail of the server 4 and the load control device 3 used in this evaluation is the same as that shown in FIG. 21. Note that the threshold of the number of response-waiting requests of the load control device is set statically to 10. Under the condition described above, the number of clients that attempt to perform session processing on the Web server is changed, and the number of sessions that can be completed by the Web server per unit time (hereinafter called a session throughput) is compared between when the load control device is provided and when the load control device is not provided.

Figure 24:
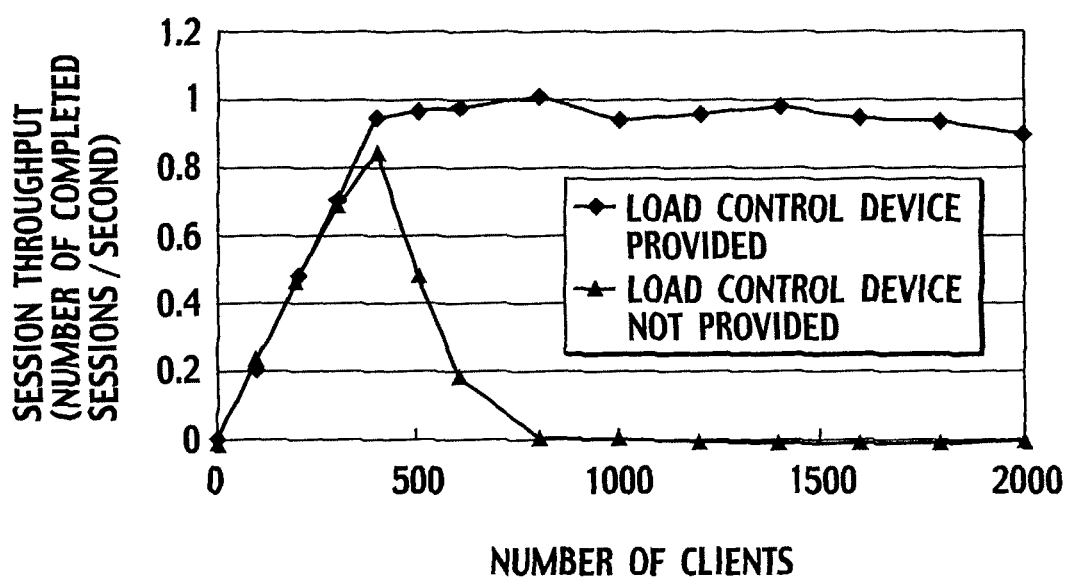
FIG. 24 is a diagram showing the effect of the priority control of requests of the present invention.

FIG. 24 shows the experiment result. The vertical axis in FIG. 24 indicates the number of clients, and the horizontal axis indicates the session throughput. As shown in FIG. 24, the session throughput of the server is increased in proportion to the number of clients regardless of whether or not the load control device is provided until the number of clients is smaller than 400. However, when the number of clients exceeds 400, the server becomes overloaded and a server resource conflict occurs among clients. As a result, when the load control device is not provided, a timeout or an interrupt occurs equally among clients and, as a result, the session throughput begins to fall. When the number of clients reaches 800, the sessions are not completed at all. In contrast, the load control device of the present invention preferentially processes sessions that have made more progress than others. As a result, even if the Web server becomes overloaded, the session throughput is kept at the maximum. The result described above shows the effect of priority control based on the load control device in this example.

The results described above show the effectiveness of the present invention.

When installed in a general-purpose information processing device, this example allows the information processing device to execute a program that implements the function equivalent to the load control device 3 described in this example. This program is recorded on a recording medium and installed on a general-purpose information processing device, or sent via a communication line and installed on a general-purpose information processing device, to allow the general-purpose information processing device to work as a device equivalent to the load control device 3 described in this example.

The program in this example includes not only a program that can be executed directly by a general-purpose information processing device but also a program that can be installed on a hard disk for execution. A compressed or encrypted program is also included.

INDUSTRIAL APPLICABILITY

The present invention avoids the degradation of server performance when too many requests are received and, at the same time, automatically sets a threshold for appropriate control, thus improving the convenience of both device (network) managers and network users.

The invention claimed is:

1. A load control device, provided between one or more clients and a server, for sending a request, received from one of said clients, to said server and for sending a response, returned from said server in response to the request, to said client, said load control device comprising:
a processing device to cause a limiting portion to limit the number of response-waiting requests which are already sent to said server but to which responses are not yet returned from said server,
the limiting portion comprising:
a buffer;
a request receiving portion that receives a request from said client, and stores the received request in said buffer;
a request sending portion that gets one request from said buffer if the number of response-waiting requests is smaller than a threshold, increments the number of response-waiting requests by one, and sends the one request to said server;
a response receiving portion that receives a response from said server; and
a response sending portion that sends the received response to said client, and decrements the number of response-waiting requests by one;
a monitoring portion that monitors an execution status of said server;
a measuring portion that measures a throughput for each threshold of the number of response-waiting requests based on a monitor result of said monitoring portion, said throughput being the number of requests processed by said server per unit time; and
a threshold increasing and decreasing portion that increases the threshold if a throughput for a current threshold is higher than throughput for a threshold lower than the current threshold and decreases the threshold if a throughput for the current threshold is lower than a throughput for a threshold lower than the current threshold.

2. The load control device according to claim 1 wherein the threshold is a value larger than 1.

3. The load control device according to claim 1, further comprising
an aggregating portion that aggregates TCP connections between itself and clients so that the number of simultaneous connections of TCP connections between said server and itself becomes equal to or smaller than the threshold of the number of response-waiting requests.

4. The load control device according to claim 1 wherein said buffer comprises a priority control portion that performs a priority control of requests based on identification information on a client sending a request.

5. The load control device according to claim 1 wherein said buffer comprises a priority control portion that performs a priority control of requests based on whether or not a particular pattern is included in a particular position or range in a request.

6. The load control device according to claim 1 wherein said buffer comprises a priority control portion that performs a priority control of requests based on whether or not a particular variable in a request is larger than a pre-set threshold.

7. The load control device according to claim 1 wherein said buffer comprises a priority control portion that performs a priority control of requests based on whether or not a request is encrypted.

8. The load control device according to claim 1 wherein said buffer comprises a notifying portion that notifies a busy message to a request accumulated for a predetermined time or longer.

9. The load control device according to claim 1 wherein said server is a Web server and said buffer comprises a priority control portion that performs a priority control of requests based on a display priority of a page display of a request.

10. The load control device according to claim 1 wherein a request is sent from a client to said load control device via a TCP connection and
said buffer comprises a priority control portion that performs a priority control of requests based on whether or not another TCP connection is established between said client and said load control device, the number of TCP connections, or whether or not the request is a first request of a TCP connection.

11. The load control device according to claim 1, further comprising:
a storing portion that, when a response contains a URL of a page component to be automatically acquired by a browser, temporarily stores a set of identification information on a response-sending destination and the URL wherein
said buffer comprises a priority control portion that performs a priority control of requests based on whether or not a set of identification information on a request sending-source and a URL matches said set of identification information on the response-sending destination and the URL that is temporarily stored.

12. The load control device according to claim 1, further comprising a priority control portion that performs a priority control of requests based on a progress status of a session to which a request belongs.

13. The load control device according to claim 1, further comprising:
a caching portion that caches session identification information on a session, to which a request processed by said server belongs, for a fixed period of time; and
a priority control portion that performs a priority control of requests based on whether or not a request has the identification information on a session that is cached.

14. The load control device according to claim 1 wherein said buffer comprises a priority control portion that performs a priority control of requests based on a degree of suspicion of unauthorized access of traffic sent from a client.

15. A non-transitory recording medium which has recorded thereon a program that is installed in a general-purpose information processing device and that causes said general-purpose information processing device to implement a function equivalent to a function of the load control device according to one of claims 1, 2 and 3-14 and which is readable by said general-purpose information processing device.

16. A load control method for execution by a load control device, provided between one or more clients and a server, for sending a request, received from one of said clients, to said server and for sending a response, returned from said server in response to the request, to said client, said load control method comprising:
  limiting the number of response-waiting requests which are already sent to said server but to which responses are not yet returned from said server, wherein
  the limiting comprises:
  receiving a request from said client;
  storing the received request in a buffer;
  getting one request from said buffer if the number of response-waiting requests is smaller than a threshold, and incrementing the number of response-waiting requests by one;
  sending the one request to said server;
  receiving a response from said server;
  sending the received response to said client and decrementing the number of response-waiting requests by one;
  monitoring an execution status of said server;
  measuring throughput for each threshold of the number of response-waiting requests based on a monitor result of said monitoring, said throughput being the number of requests processed by said server per unit time; and
  increasing the threshold if a throughput for a current threshold is higher than a throughput for a threshold lower than the current threshold and decreasing the threshold if a throughput for the current threshold is lower than a throughput for a threshold lower than the current threshold.

17. The load control method according to claim 16 wherein the threshold is a value larger than 1.

18. The load control method according to claim 16, further comprising:
  aggregating TCP connections between itself and clients so that the number of simultaneous connections of TCP connections between said server and itself becomes equal to or smaller than the threshold of the number of response-waiting requests.

19. A load control device, provided between clients and a server, for sending a request, received from one of said clients, to said server and for sending a response, returned from said server in response to the request, to said client, said load control device comprising:
  a processing device to cause a limiting portion to limit the number of response-waiting requests which are already sent to said server but to which responses are not yet returned from said server,
  the limiting portion comprising:
    a buffer in which requests received by the load control device are temporarily accumulated if the number of response-waiting requests has reached a threshold; and
    a transmitting portion that does not send a request from said buffer until the number of response-waiting requests falls below the threshold;
  a monitoring portion that monitors an execution status of said server;
  a measuring portion that measures a throughput for each threshold of the number of response-waiting requests based on a monitor result of said monitoring portion, said throughput being the number of requests processed by said server per unit time;
  a threshold increasing and decreasing portion that increases the threshold if a throughput for a current threshold is higher than a throughput for a threshold lower than the current threshold and decreases the threshold if a throughput for the current threshold is lower than a throughput for a threshold lower than the current threshold; and
  a determining portion that determines whether or not the number of response-waiting requests has reached the threshold, and if the number of response-waiting requests has reached the threshold, determines whether or not the threshold is to be increased or decreased.

20. A load control method for execution by a load control device, provided between clients and a server, for sending a request, received from one of said clients, to said server and for sending a response, returned from said server in response to the request, to said clients, said load control method comprising:
  a limiting step of limiting the number of response-waiting requests which are already sent to said server but to which responses are not yet returned from said server, wherein
  the limiting step comprises:
    a step of temporarily accumulating requests received the load control device in a buffer if the number of response-waiting requests has reached a threshold; and
    a step of not sending a request from said buffer to said server until the number of response-waiting requests falls below the threshold;
  a monitoring step of monitoring an execution status of said server;
  a step of measuring throughput for each threshold of the number of response-waiting requests based on a monitor result of said monitoring step, said throughput being the number of requests processed by said server per unit time;
  a step of increasing the threshold if a throughput for a current threshold is higher than a throughput for a threshold lower than the current threshold and decreasing the threshold if a throughput for the current threshold is lower than a throughput for a threshold lower than the current threshold;
  a step of determining whether or not the number of response-waiting requests has reached the threshold; and
  a step of determining whether or not the threshold is to be increased or decreased if the number of response-waiting requests has reached the threshold.

\* \* \* \* \*